(12) United States Patent
Koehler et al.

(10) Patent No.: US 11,653,641 B2
(45) Date of Patent: May 23, 2023

(54) FURNITURE PROTECTOR AGAINST BED BUGS AND OTHER CRAWLING INSECTS

(71) Applicant: University of Florida Research Foundation, Inc., Gainesville, FL (US)

(72) Inventors: Philip G. Koehler, Gainesville, FL (US); Roberto M. Pereira, Gainesville, FL (US); Enrico Paolo Levi, Modena (IT)

(73) Assignee: University of Florida Research Foundation, Inc., Gainesville, FL (US)

( * ) Notice: Subject to any disclaimer, the term of this patent is extended or adjusted under 35 U.S.C. 154(b) by 204 days.

(21) Appl. No.: 17/023,760

(22) Filed: Sep. 17, 2020

(65) Prior Publication Data

US 2021/0000098 A1    Jan. 7, 2021

Related U.S. Application Data

(63) Continuation-in-part of application No. 15/647,607, filed on Jul. 12, 2017, now abandoned, which is a
(Continued)

(51) Int. Cl.
*A01M 1/10* (2006.01)
*A01M 1/14* (2006.01)
*A01M 1/20* (2006.01)

(52) U.S. Cl.
CPC .............. *A01M 1/103* (2013.01); *A01M 1/14* (2013.01); *A01M 1/20* (2013.01); *A01M 2200/011* (2013.01)

(58) Field of Classification Search
CPC .......... A01M 1/103; A01M 1/10; A01M 1/20; A01M 1/2011; A01M 1/24;
(Continued)

(56) References Cited

U.S. PATENT DOCUMENTS

| | | |
|---|---|---|
| 21,726 A | 10/1858 | Shell |
| 125,326 A | 4/1872 | Peck |

(Continued)

FOREIGN PATENT DOCUMENTS

| | | |
|---|---|---|
| CA | 2614279 A1 | 3/2007 |
| CA | 2783685 A1 | 11/2012 |

(Continued)

OTHER PUBLICATIONS

Boase, Bedbugs—Back from the Brink, The Royal Society of Chemistry, Aug. 2001, pp. 159-162, 4 pages.
(Continued)

*Primary Examiner* — Kathleen I Alker
(74) *Attorney, Agent, or Firm* — Thomas Horstemeyer, LLP

(57) ABSTRACT

Pitfall traps, coasters, devices, apparatus, systems and methods for capturing crawling insects, such as bed bugs, and/or for preventing the insects from climbing up furniture legs to furniture such as beds, cots, chairs and any type of furniture where a person would rest or sleep. Smooth slick surfaces and/or pesticide treated surfaces can be located on underside facing horizontal or angled surfaces used with or without sticky surfaces which all can be used to prevent insect and bed bug travel and assist in helping trap the insects and bed bugs.

20 Claims, 20 Drawing Sheets

Related U.S. Application Data continuation of application No. PCT/US2016/016839, filed on Feb. 5, 2016.

(60) Provisional application No. 62/112,926, filed on Feb. 6, 2015.

(58) Field of Classification Search
CPC ............ A01M 2200/011; A01M 29/30; A01M 29/34; A01M 1/2005; A01M 1/00; A01G 9/28; A47B 97/00; E04H 17/063
USPC ....... 43/121, 123, 107, 109, 124, 132.1, 133
See application file for complete search history.

(56) References Cited

U.S. PATENT DOCUMENTS

| | | |
|---|---|---|
| 223,321 A | 1/1880 | Denton |
| 278,294 A | 5/1883 | Thum |
| 391,014 A | 10/1888 | Bosse |
| 414,606 A | 11/1889 | Thum |
| 427,143 A | 5/1890 | Bauchmuller |
| 431,537 A | 7/1890 | Trenner |
| 466,637 A | 1/1892 | Thum |
| RE11,276 E | 10/1892 | Thum |
| 486,138 A | 11/1892 | Thum |
| 510,727 A | 12/1893 | Thum |
| 534,457 A | 2/1895 | Thum |
| 713,803 A | 11/1902 | Rothweiler |
| 800,354 A | 9/1905 | Boyd |
| 1,068,258 A | 7/1913 | Mccombs |
| 1,242,680 A | 10/1917 | Goedeke |
| 1,248,283 A | 11/1917 | Derek |
| 1,265,481 A | 5/1918 | Mosby |
| 1,305,553 A | 6/1919 | Kruse |
| 1,325,316 A | 12/1919 | Diss |
| 1,402,998 A | 1/1922 | Anderson |
| 1,456,395 A | 5/1923 | Walter |
| 1,581,410 A | 4/1926 | Welsh |
| 1,655,128 A | 1/1928 | Berghorn |
| 1,745,905 A | 2/1930 | Oakman |
| 1,788,325 A | 1/1931 | Ramsey |
| 1,800,613 A | 4/1931 | Farrell |
| 1,972,762 A | 9/1934 | Drummond |
| 2,012,651 A * | 8/1935 | Beall ................. A01M 1/103 43/131 |
| 2,156,380 A | 5/1939 | Gurley |
| 2,167,978 A | 8/1939 | Balthasar |
| 2,177,627 A | 10/1939 | Gurley |
| 2,251,273 A | 8/1941 | Gurley |
| 2,264,875 A | 12/1941 | Greuling |
| 2,911,756 A | 11/1959 | Geary |
| 2,936,926 A | 5/1960 | Miller |
| 2,962,836 A | 12/1960 | Hughes |
| 3,864,866 A | 2/1975 | Kosinsky |
| 3,913,259 A | 10/1975 | Nishimura et al. |
| 3,940,874 A | 3/1976 | Katsuda |
| 4,168,591 A | 9/1979 | Shaw |
| D260,418 S | 8/1981 | Baker et al. |
| 4,395,842 A | 8/1983 | Margulies |
| 4,424,642 A | 1/1984 | Stubler et al. |
| 4,438,584 A | 3/1984 | Baker et al. |
| 4,698,934 A | 10/1987 | Gonzalez et al. |
| 4,709,503 A | 12/1987 | McQueen |
| 4,793,093 A | 12/1988 | Gentile |
| 4,800,671 A | 1/1989 | Olson |
| 4,815,231 A | 3/1989 | McQueen |
| 4,862,638 A | 9/1989 | Stevenson |
| 4,867,731 A | 9/1989 | Willard et al. |
| 4,890,416 A | 1/1990 | Roberts |
| 4,908,980 A | 3/1990 | Sherman |
| 5,042,192 A | 8/1991 | Osteen |
| 5,109,800 A | 5/1992 | Williams |
| 5,113,798 A | 5/1992 | Rera |
| 5,125,363 A | 6/1992 | McGaha |
| 5,147,626 A | 9/1992 | Chang et al. |
| D335,940 S | 5/1993 | McGrath et al. |
| 5,231,790 A | 8/1993 | Dryden et al. |
| 5,274,950 A | 1/1994 | Roberts |
| 5,277,149 A | 1/1994 | East |
| D343,929 S | 2/1994 | Karapetian |
| 5,303,501 A | 4/1994 | Seemann |
| 5,353,556 A | 10/1994 | Hand et al. |
| D353,233 S | 12/1994 | Robles |
| 5,394,640 A | 3/1995 | Musket |
| 5,414,954 A | 5/1995 | Long |
| 5,438,792 A | 8/1995 | Monett et al. |
| 5,440,833 A | 8/1995 | Stoll |
| D362,090 S | 9/1995 | Baldwin et al. |
| 5,544,445 A * | 8/1996 | Mantilla ................. A01G 9/28 47/33 |
| 5,572,825 A | 11/1996 | Gehret |
| 5,577,461 A | 11/1996 | Sebastian et al. |
| 5,640,488 A | 6/1997 | Junqua et al. |
| 5,647,299 A | 7/1997 | Pearson-Falcon |
| 5,794,564 A | 8/1998 | Paro |
| D399,029 S | 9/1998 | Falcone et al. |
| 5,857,428 A | 1/1999 | Gitzen |
| 5,881,671 A | 3/1999 | Riedl |
| D448,127 S | 9/2001 | Zelinger |
| 6,378,242 B1 | 4/2002 | Roberts |
| 6,442,889 B1 | 9/2002 | Lee |
| 6,505,433 B2 | 1/2003 | Roberts |
| 6,510,648 B2 | 1/2003 | Roberts |
| 6,513,280 B2 | 2/2003 | Roberts |
| 6,640,488 B2 | 11/2003 | Roberts |
| 6,735,901 B1 | 5/2004 | Bellehumeur |
| 6,739,087 B2 | 5/2004 | Weiser et al. |
| 6,837,008 B2 | 1/2005 | Roberts et al. |
| 6,862,839 B2 | 3/2005 | Watanabe |
| 6,912,815 B1 | 7/2005 | Koehler et al. |
| 6,931,798 B1 * | 8/2005 | Pocai ..................... A01G 9/28 47/32.4 |
| 6,966,142 B1 | 11/2005 | Hogsette et al. |
| D556,954 S | 12/2007 | May |
| 7,469,499 B2 | 12/2008 | Nelson et al. |
| 7,856,752 B1 | 12/2010 | Eilersen |
| 8,104,223 B1 | 1/2012 | Rodriguez |
| D668,314 S | 10/2012 | MacKay et al. |
| 8,316,578 B2 | 11/2012 | Faham et al. |
| 8,402,690 B2 | 3/2013 | Schneidmiller et al. |
| 8,413,370 B2 | 4/2013 | Messian |
| 8,635,807 B2 | 1/2014 | Frisch et al. |
| 8,661,728 B2 | 3/2014 | Borth et al. |
| 8,707,615 B2 * | 4/2014 | Cullen ................. A01M 29/34 43/107 |
| 8,789,309 B2 | 7/2014 | Fabry |
| 8,800,198 B2 | 8/2014 | Frisch |
| 8,850,741 B2 | 10/2014 | Hickman |
| 8,966,812 B2 | 3/2015 | McKnight |
| 9,066,511 B2 | 6/2015 | McKnight et al. |
| D739,615 S | 9/2015 | Robertson |
| 9,179,662 B1 | 11/2015 | Kort |
| 9,226,488 B2 | 1/2016 | Schumacher |
| 2004/0020104 A1 | 2/2004 | Feldhege et al. |
| 2009/0145019 A1 | 6/2009 | Nolen et al. |
| 2009/0223115 A1 | 9/2009 | Lang et al. |
| 2010/0212213 A1 | 8/2010 | Harold et al. |
| 2011/0047860 A1 | 3/2011 | Black et al. |
| 2011/0107654 A1 | 5/2011 | Wieler |
| 2011/0225873 A1 | 9/2011 | McKnight et al. |
| 2011/0289824 A1 | 12/2011 | Wu et al. |
| 2012/0110894 A1 | 5/2012 | Black et al. |
| 2012/0151823 A1 | 6/2012 | Donoho et al. |
| 2012/0167309 A1 | 7/2012 | Heidorn |
| 2012/0204477 A1 | 8/2012 | Fairleigh et al. |
| 2012/0210628 A1 | 8/2012 | Park et al. |
| 2012/0227312 A1 | 9/2012 | Fairleigh et al. |
| 2012/0227313 A1 | 9/2012 | Mozeika et al. |
| 2012/0285076 A1 | 11/2012 | Banfield |
| 2012/0291336 A1 | 11/2012 | Friend |
| 2012/0291337 A1 | 11/2012 | Curcio |
| 2013/0111801 A1 | 5/2013 | White et al. |
| 2013/0111802 A1 | 5/2013 | Oehlschlager |
| 2013/0180161 A1 | 7/2013 | Vasudeva et al. |

(56) References Cited

U.S. PATENT DOCUMENTS

| | | | |
|---|---|---|---|
| 2013/0219771 | A1 | 8/2013 | Black et al. |
| 2013/0312313 | A1 | 11/2013 | Lefkowitz et al. |
| 2013/0318861 | A1 | 12/2013 | Roeder |
| 2014/0075825 | A1 | 3/2014 | Vasudeva et al. |
| 2014/0208643 | A1* | 7/2014 | Inglis .................. A01G 13/105 47/33 |
| 2014/0215901 | A1 | 8/2014 | Koehler et al. |
| 2014/0290123 | A1 | 10/2014 | Duff |
| 2015/0007485 | A1 | 1/2015 | Hortel et al. |
| 2015/0237842 | A1 | 8/2015 | Thuis et al. |
| 2016/0100567 | A1 | 4/2016 | McKnight et al. |
| 2016/0198692 | A1 | 7/2016 | Simpson et al. |
| 2016/0262366 | A1 | 9/2016 | Rola |

FOREIGN PATENT DOCUMENTS

| | | | | |
|---|---|---|---|---|
| DE | 3335100 | C * | 8/1984 | .......... A01G 13/105 |
| DE | 8322953 | U1 * | 5/1986 | ............... A01G 1/08 |
| DE | 29617446 | U1 * | 12/1996 | .......... A01G 13/105 |
| DE | 10207916 | C1 * | 4/2003 | .......... A01G 13/105 |
| DE | 20311195 | U1 * | 10/2003 | .......... A01G 13/105 |
| FR | 2897508 | A1 * | 8/2007 | ............... A01G 1/08 |
| FR | 2943503 | A1 * | 10/2010 | ............... A01G 1/08 |
| FR | 3023123 | A1 * | 1/2016 | .......... A01G 13/105 |
| GB | 2397020 | A * | 7/2004 | .......... A01G 13/105 |
| GB | 2463953 | A | 4/2010 | |
| JP | 01138285 | | 5/1989 | |
| JP | 09108054 | | 4/1997 | |
| JP | 10192076 | | 7/1998 | |
| WO | 2010043995 | A1 | 4/2010 | |

OTHER PUBLICATIONS

Cooper, Bed Bugs—Still More Questions Than Answers: A Need for Research and Public Awareness, American Sntomologist, 2006, pp. 111-112, vol. 52, No. 2, 2 pages.

Kaakeh, et al., Evaluation of Trapping and Vacuuming Compared with Low-Impact Insecticide Tactics for Managing German Cockroaches in Residences, Entomological Society of America, J. Econ. Entomol., 1997, pp. 972-982, vol. 90 , No. 4, 7 pages.

Kardatzke, et al., How Roach Surveillance Saves Time, Material, and Labor, Pest Control, Jun. 1981, pp. 46-48, 3 pages.

Obeng-Ofori, The Behaviour of 9 Stored Product Beetles at Pitfail Trap Arenas and Their Capture in Millet, Sntemol. exp. appl., 1993, pp. 161-169, 5 pages.

Phillips, et al, Beyond Origami: Using Behavioural Observations as a Strategy to Improve Trap Design, Entomol. exp_ appl., 1992, vol. 62, pp. 67-74, 5 pages.

Potter, A Bed Bug State of Mind: Emerging Issues in Bed Bug Management, Pest Control Technology, 2005, pp. 83, 82-85, 88, 90, 92, 93, 96 and 97, 6 pages.

Vetter, et al, An Infestation of 2,055 Brown Recluse Spiders (Araneae:Sicariidae) and No Envenomations in a Kansas Home: Implications for Bite Diagnoses in Nonendemic Areas, Journal of Medical Entomology, 2002, pp. 948-951, vol. 39, No. 6, 5 pages.

Wang, et al, Evaluation of Two Least Toxic Integrated Pest Management Programs for Managing Bed Bugs Heteroptera: Cimicidae) with Discussion of a Bed Bug Intercepting Device, Journal of Medical Entomology, 2009, pp. 566-571, vol. 46, No. 3, 7 pages.

Wang, et al, Comparison of Cockroach Traps and Attractants for Monitoring German Cockroaches Dictyoptera: Blattellidae, Environmental entomology, 2006, pp. 765-770, vol. 35, No. 3, 3 pages, abstract.

Wang, et al, Effectiveness of Bed Bug Monitors for Detecting and Trapping Bed Bugs in Apartments, J. Econ. Entomol., 2011, pp. 274-278, vol. 104, No. 1, 5 pages.

Ballard, et al, Laboratory and Field Evaluations of German Cockroach (Orthoptera: Blattellidae) Traps, Journal of Economic Entomology, 1984, pp. 661-665, vol. 77, 5 pages.

Barak, et al, Using Attractant Traps to Help Detect, Pest Control, Oct. 1977, pp. 14-20, 7 pages.

Potter, The History of Bed Bug Management, American Entomologist, 2011, pp. 14-25, vol. 57, 8 pages.

University of Florida Research Foundation, Inc., PCT Patent Application No. PCT/US2016/016839 filed Feb. 5, 2016, Notification of Transmittal of the International Search Report and the Written Opinion of the International Searching Authority, or the Declaration dated Sep. 28, 2016, 16 pages.

University of Florida Research Foundation, Inc., PCT Patent Application No. PCT/US2016/016839 filed Feb. 5, 2017, Notification Concerning Transmittal of International Preliminary Report on Patentability dated Aug. 17, 2017, 13 pages.

Cooper, Bed Bugs—Still More Questions Than Answers: A Need for Research and Public Awareness, American Entomologist, 2006, pp. 111-112, vol. 52, No. 2, 2 pages.

Kardatzke, et al., How Roach Surveillance Saves Time, Material, and Labor, Pest Control, Jun. 1981, pp. 46-48, 8 pages.

Wang, et al, Evaluation of Two Least Toxic Integrated Pest Management Programs for Managing Bed Bugs Heteroptera: Cimicidae) with Discussion of a Bed Bug Intercepting Device, Journal of Medical Entomology, 2009, pp. p66-571, vol. 46, No. 3, 7 pages.

University of Florida Research Foundation, Inc., PCT Patent App. No. PCT/US2016/016839 filed Feb. 5, 2017, Notification Concerning Transmittal International Preliminary Report on patentability dated Aug. 17, 2017, 13 pages.

* cited by examiner

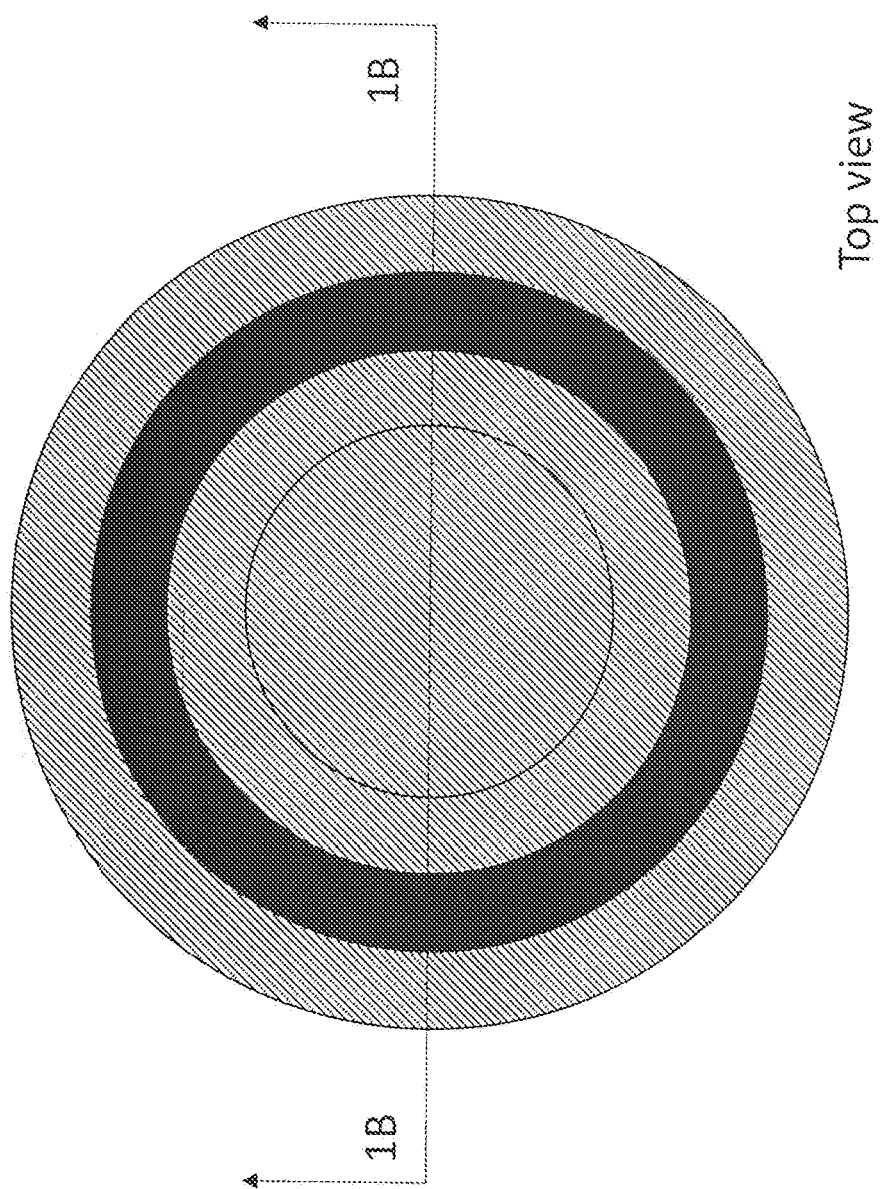

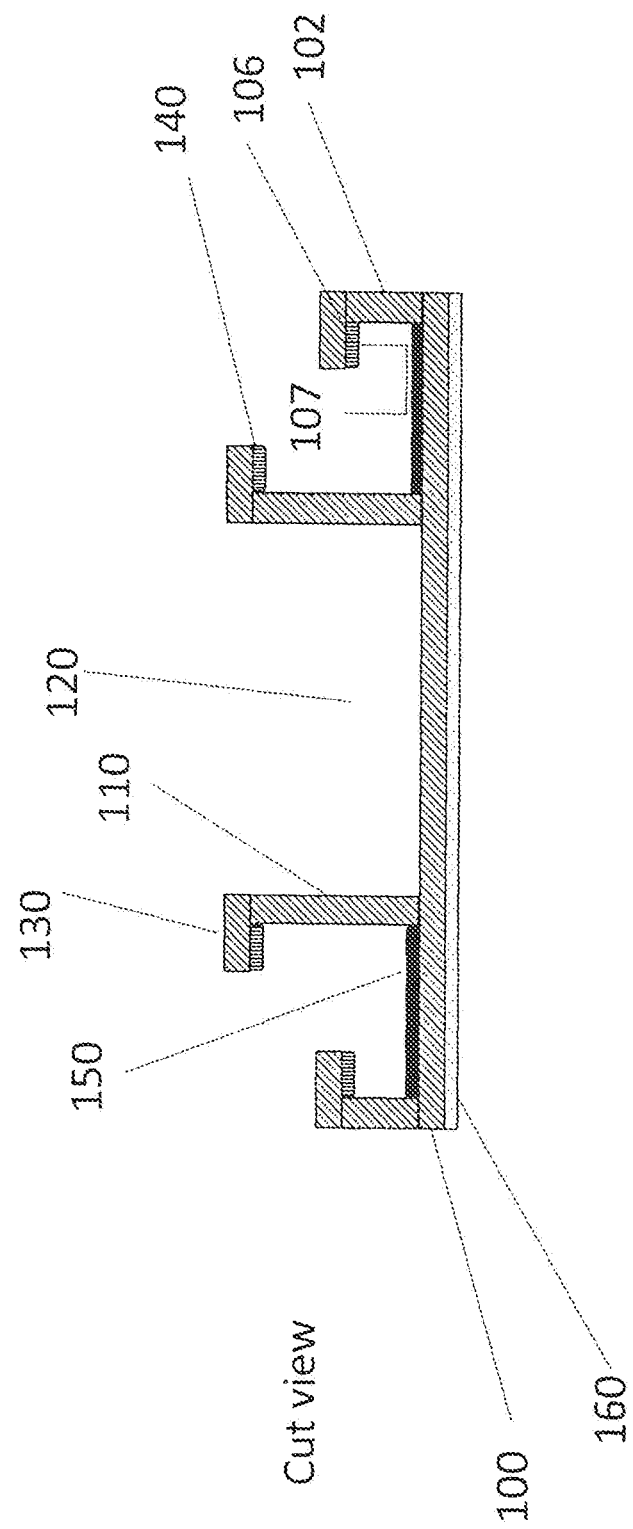

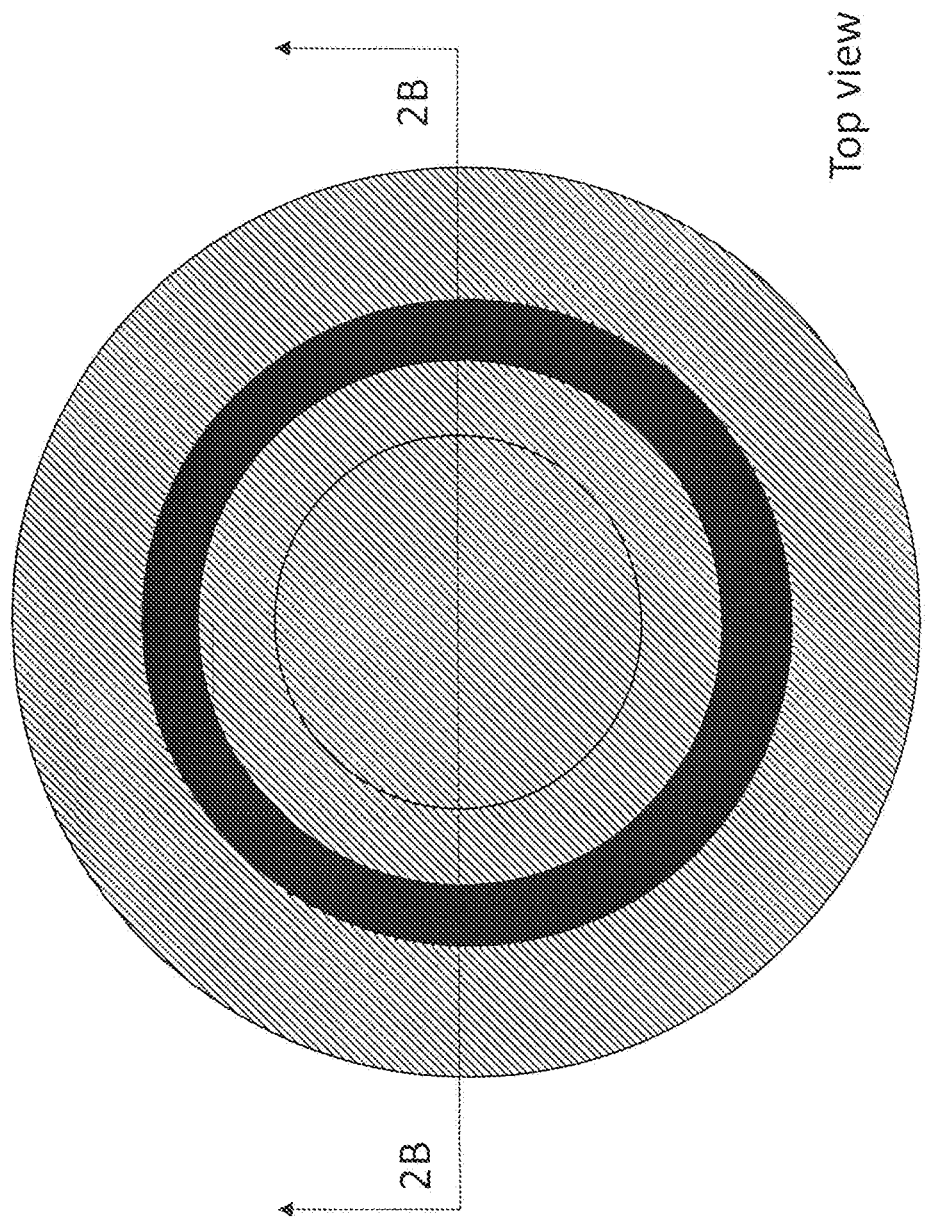

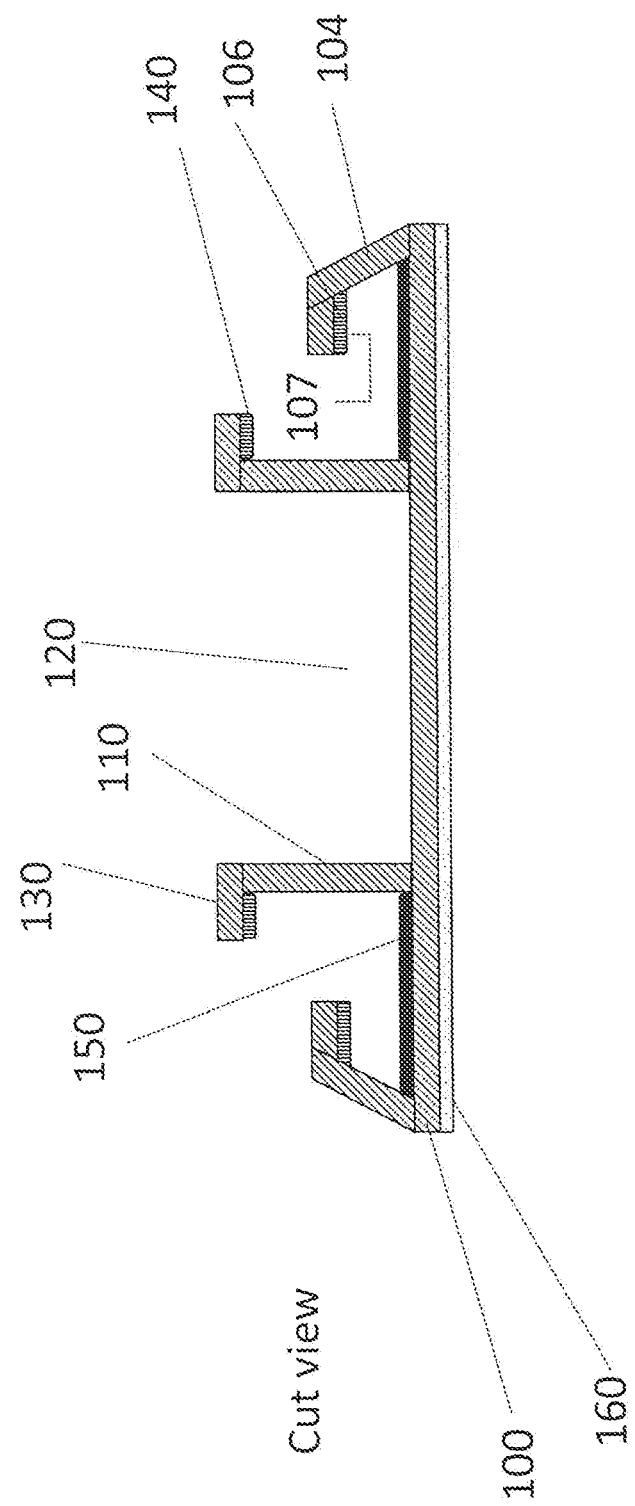

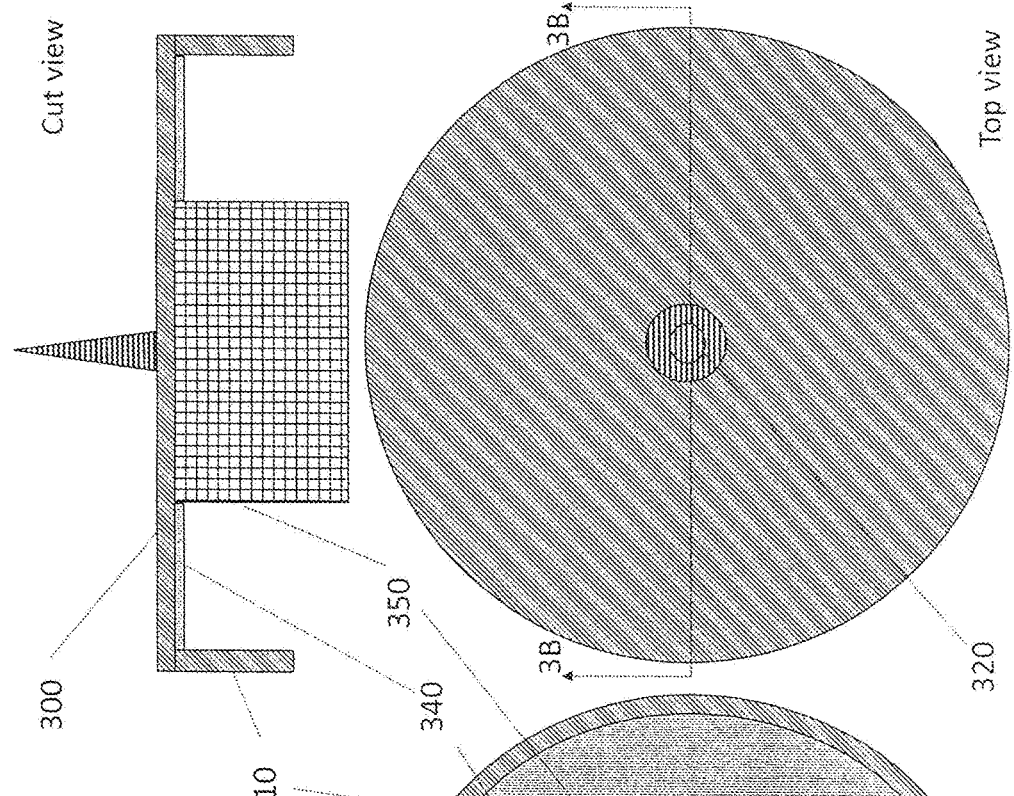
Fig. 3B
Fig. 3A
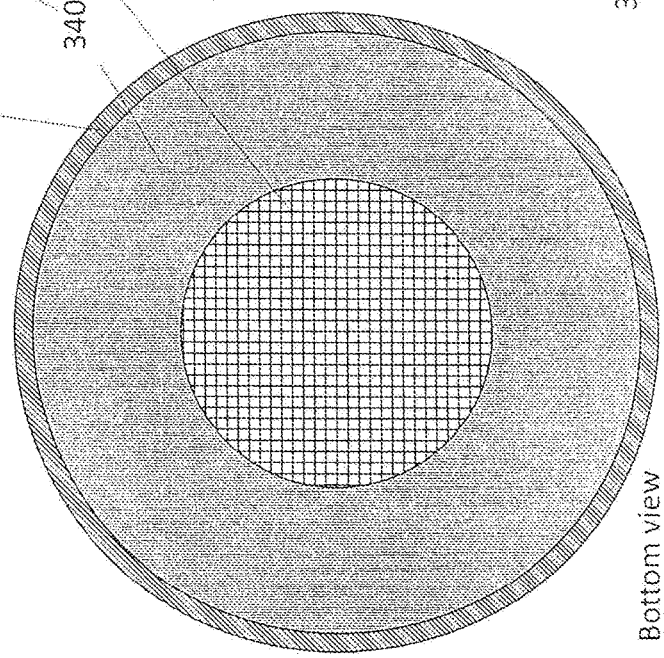
Fig. 3C

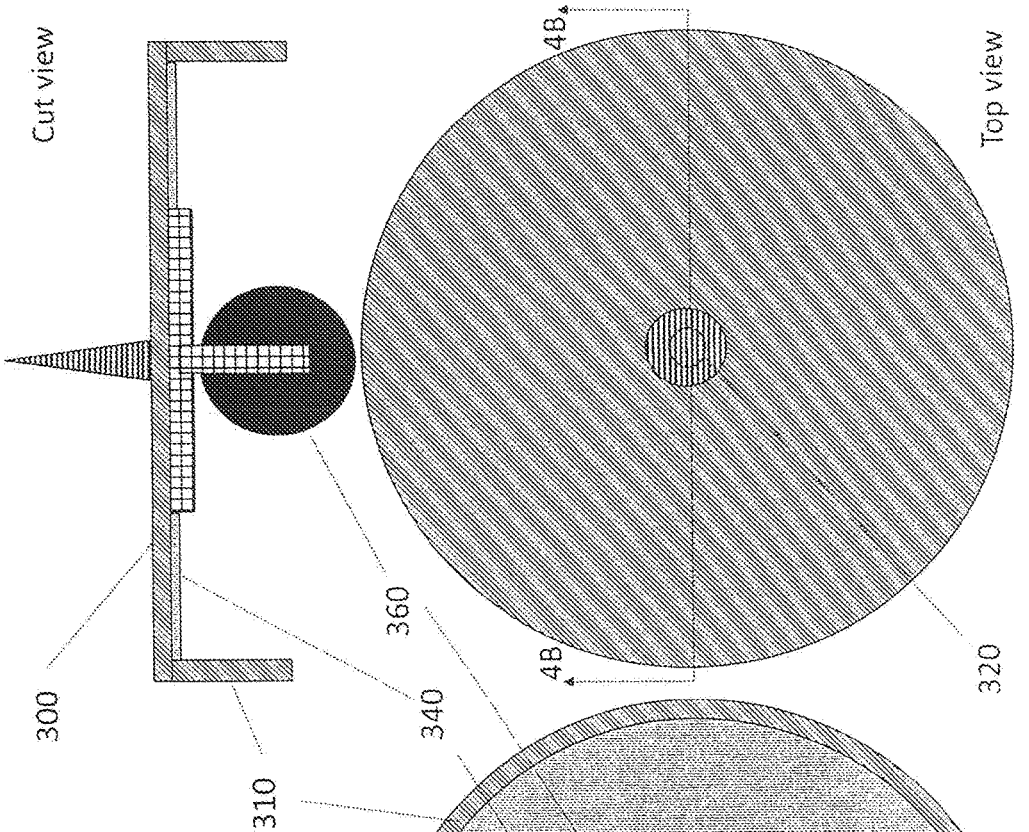
Fig. 4B
Fig. 4A
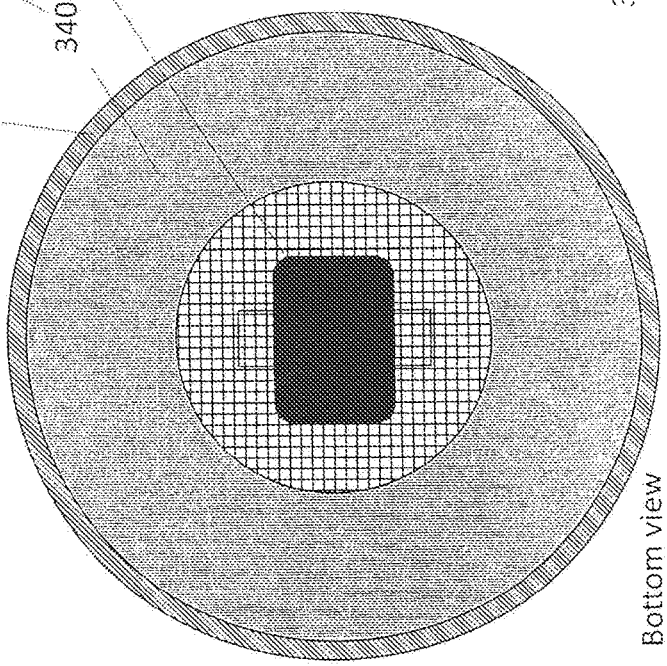
Fig. 4C

FURNITURE PROTECTOR AGAINST BED BUGS AND OTHER CRAWLING INSECTS

CROSS REFERENCE TO RELATED APPLICATION

This application is a continuation-in-part of U.S. patent application Ser. No. 15/647,607, filed on Jul. 12, 2017 which is a Continuation of Patent Cooperation Treaty Application PCT/US16/16839 filed Feb. 5, 2016, which claims the benefit of priority to U.S. Provisional Application Ser. No. 62/112,926 filed Feb. 6, 2015. The entire disclosure of each of the applications listed in this paragraph are incorporated herein by specific reference thereto.

FIELD OF INVENTION

This invention relates to insect control devices, and in particular to pit fall traps, coasters, devices, apparatus, systems and methods having underside facing surfaces with smooth (slick) and/or pesticide treated surfaces for allowing the capturing of crawling insects, such as bed bugs, and for preventing insects and bed bugs from climbing up furniture legs to furniture such as beds.

BACKGROUND AND PRIOR ART

Circular pitfall traps are the most common way to protect furniture from bed bugs that crawl from the room onto the bed and to monitor bed bug populations. These circular traps have pitfall areas with almost vertical sides that are either too smooth for a bed bug to climb or coated with talc so the bugs cannot get a grip to climb. There are several problems with these types of traps. Debris easily falls in the traps and coats the sides with dirt. Bed bugs then can easily climb out. Also, when placing traps with pitfall sides coated with talc, the talc is easily removed by touching with fingers or hands. Bed bugs can, over time, climb these smooth or talc-coated surfaces, so bed bug escape from these traps can occur.

Sticky traps have become popular for monitoring/trapping crawling insects, such as cockroaches and the like. However, traditional sticky traps have problems in trapping bed bugs. For example, research has shown that when a bed bug approaches a sticky trap, the bed bug touches one part of the sticky trap and is able to use their other legs which are not on the sticky trap enough leverage to pull the trapped leg(s) from the sticky traps.

The use of transparent paper such as acetate paper, surrounding a sticky trap can be smooth enough to reduce the leverage factor to prevent the bed bug from pulling themselves off the trap. However, test data has shown that using too smooth of a surface causes a behavior problem where the bed bug actually avoids traveling on the smooth. For example, U.S. Pat. No. 5,572,825 to Gehret describes a glue trap having a slippery surface about the perimeter that does not allow for the cockroach to have enough leverage to remove themselves from the sticky trap. The problem is that the "silicone coated . . . paper . . . " referenced in this patent has been demonstrated to cause bed bugs to avoid the surface as a travel surface.

The too slippery surface causes a behavior effect in the bed bugs to avoid contact with very slippery surfaces. A major problem in motels and hotels is the proliferation of bed bug type insects that can travel from the floor up legs of furniture. The above devices are not capable of stopping and preventing all bed bugs from climbing from a floor location up legs to furniture, such as beds, and the like.

Thus, the need exists for solutions to the above problems with the prior art.

SUMMARY OF THE INVENTION

A primary objective of the present invention is to provide traps, coasters, devices, apparatus, systems and methods for preventing and capturing insects, such as bed bugs, from climbing up furniture legs to furniture where persons rest or sleep thereon.

A secondary objective of the present invention is to provide traps, coasters, devices, apparatus, systems and methods for preventing and capturing insects that combines a smooth (slick) surface along with or without a sticky surface for protecting furniture from insects, such as bed bugs.

A third objective of the present invention is to provide traps, coasters, devices, apparatus, systems and methods for preventing and capturing insects that combines a pesticide treated surface along with or without a sticky surface for protecting furniture from insects, such as bed bugs The invention can work with different types of furniture, such as but not limited to beds, cots, bassinets, cribs, easy chair, reclining chairs, and any other furniture, where a person would rest or sleep.

This invention encompasses a novel pitfall trap with an inner lip and an outer lip overhanging the pitfall area. The sides do not need to be smooth or talc-coated, but the underside of the lip can be smooth (slick) with or without pesticide treated to prevent bed bug/insect movement.

There are several reasons this invention is superior to vertical smooth sides. The first is that bed bugs have more difficulty crossing the underside smooth (slick) and/or pesticide treated surface upside down. The bugs cannot hang on the surface and fall into the pitfall part of the trap. Therefore, this invention is better for capturing bed bugs. A second reason the trap is superior is that the underside smooth/pesticide surface is protected from debris that falls from the room into the trap. Debris falls on the sides and bottom of the trap, but does not adhere to the inner smooth/pesticide underside surface. Therefore the trap remains effective when used as directed.

The bottom of the trap can be coated with insecticide to kill bugs that fall into the trap or with sticky glue to retain them. The coating is not necessary to retain the bugs but is an optional part of the trap.

This Invention incorporates one or more of the following elements in order to produce a barrier that prevents bed bugs and other crawling insects from climbing on a piece of furniture.

An embodiment of the invention can be the combination of both a sticky surface in the pit to prevent insect escape and a slick surface or a pesticide-treated surface on the underside of a barrier the insects have to cross.

The novel pitfall trap barrier can be used to prevent bed bugs and other crawling insects from climbing on a piece of furniture. The inside of the pitfall can optionally be lined with a sticky substance to prevent insect escape. The underside of the barrier is a slick or pesticide treated surface in order to further prevent escape.

The invention can combine slick (smooth) surfaces to be adjacent to sticky surfaces, where the insect becomes stuck on the sticky surface and cannot remove themselves because they cannot get traction leverage by stepping on the adjacent (i.e. direction next to one another) slick (smooth) surface.

Further objects and advantages of this invention will be apparent from the following detailed description of the presently preferred embodiments which are illustrated schematically in the accompanying drawings.

BRIEF DESCRIPTION OF THE FIGURES

FIG. 1A is a top view of a first embodiment of a trap barrier.

FIG. 1B is a cross-sectional view of the trap barrier of FIG. 1A along arrows 1B.

FIG. 2A is a top view of a second embodiment trap barrier.

FIG. 2B is a cross-sectional view of the trap barrier of FIG. 2A along arrows 2B.

FIG. 3A is a top view of a third embodiment trap barrier.

FIG. 3B is a cross-sectional view of the trap barrier of FIG. 3A along arrows 3B. FIG. 3C is a bottom view of the trap barrier of FIG. 3A.

FIG. 4A is a top view of a fourth embodiment trap barrier.

FIG. 4B is a cross-sectional view of the trap barrier of FIG. 4A along arrows 4B.

FIG. 4C is a bottom view of the trap barrier of FIG. 4A.

DESCRIPTION OF THE PREFERRED EMBODIMENTS

Figures 5A, 5B, 5C:
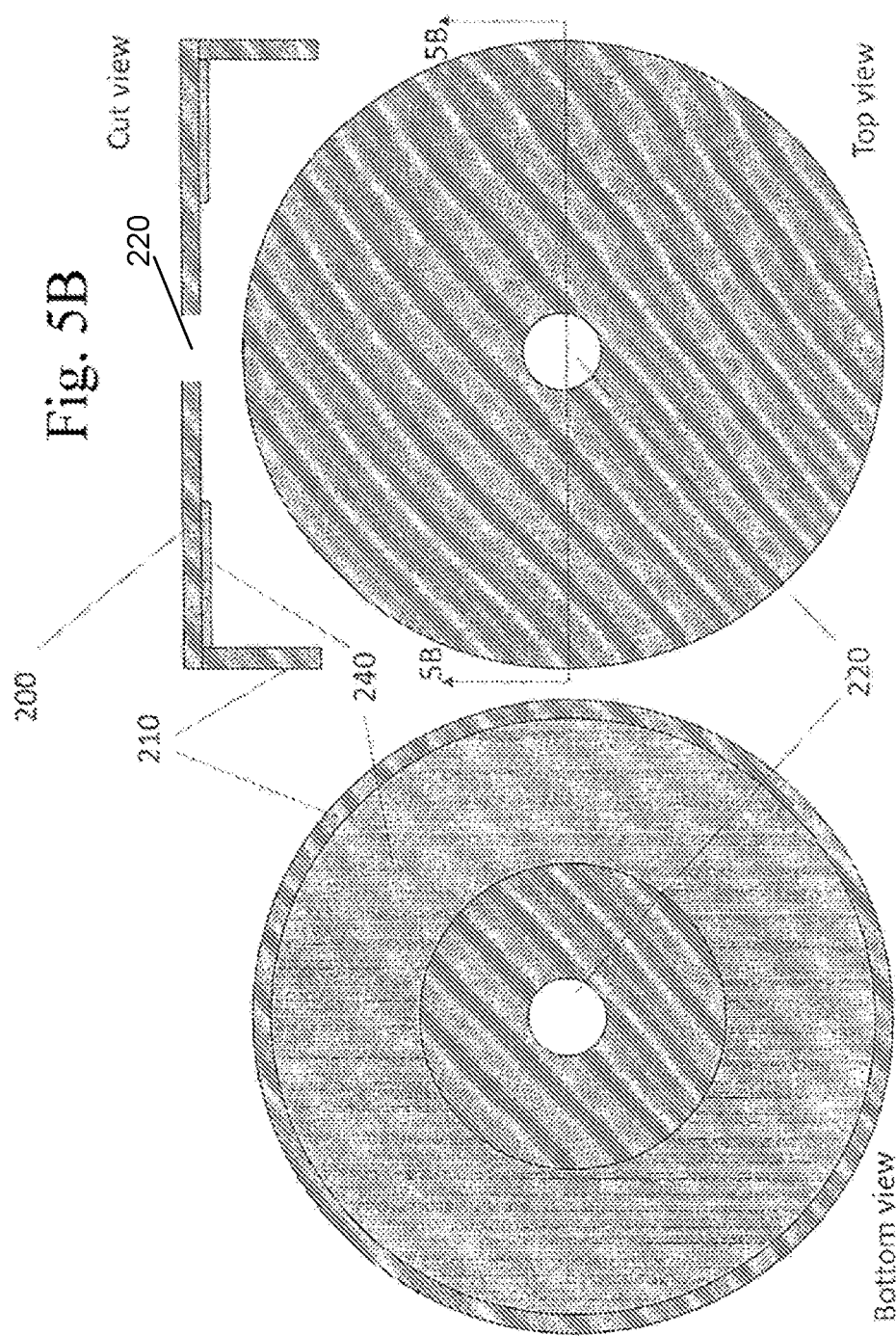
FIG. 5A is a top view of a fifth embodiment trap barrier.
FIG. 5B is a cross-sectional view of the trap barrier of FIG. 5A along arrows 5B.
FIG. 5C is a bottom view of the trap barrier of FIG. 5A.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described
100 Trap bottom
102 outer wall of well (moat)
104 angled outer wall of well (moat)
106 inner facing lip
107 Smooth or pesticide treated surface
110 Side wall
120 Furniture leg well
130 Large furniture leg support
140 Smooth or pesticide treated surface
150 Sticky surface
160 Slick surface to facilitate furniture move
200 Protector top
310 Side wall
220 Furniture leg bolt hole
240 Smooth or pesticide treated surface
300 Protector top
310 Side wall
320 Furniture attachment peg
340 Smooth or pesticide treated surface
350 Furniture support leg
360 Caster
400 Furniture protector
500 small furniture leg
550 Large furniture leg
600 Furniture bottom
700 Embodiment without well (moat)

FIG. 1A is a top view of a first embodiment of a trap barrier. FIG. 1B is a cross-sectional view of the trap barrier of FIG. 1A along arrows 1B.

Referring to FIGS. 1A-1B, the trap barrier can include a solid base bottom 100 having a generally ring shaped pit or moat with a sticky surface 150 and an inner wall 110 for supporting a furniture leg inside of a well area 120 and having an outwardly bent edge 130 with a lower facing surface having a smooth surface or pesticide treated surface.

The barrier can have an outer wall 102 having an inwardly bent edge 106, with an undersurface 107 that can have a smooth (slick) or pesticide-treated surface. Additionally, the undersurface can be both a smooth (slick) surface with a pesticide treated surface.

The inner wall 110 can have a greater height than the outer wall 102. Underneath the base bottom 100 can be a surface 160 such as a slick surface to facilitate moving furniture that is supported by the barrier. Here, the outer wall 102 is generally perpendicular to the base 100.

Smooth surface 140, 107, can include but is not limited to any plastic material, such as but not limited to plastic laminated paper, polyurethane, polyacrylic, and Plexiglas.

Pesticide treated surfaces 140, 107 can include but are not limited to Pyrethroids (e.g. permethrin, cypermethrin, lambacyhalothrin, cyfluthrin), organophosphates (e.g. malathion, dichlorvos), carbamates (e.g. propoxur, methomyl), repellents (e.g. diethyl toluamide, piperazines), essential plant oils (e.g. lemongrass oil, thyme oil, citronella, geraniol).

Sticky surface 150, such as but not limited to sticky surface such as those used in a Victor roach glue trap and monitor (Woodstream Corporation, Lititz, Pa.).

Slick surface 160, can include but is not limited to plastic, glass, Teflon coated metal, polished metal, smooth painted or varnished surfaces.

FIG. 2A is a top view of a second embodiment trap barrier. FIG. 2B is a cross-sectional view of the trap barrier of FIG. 2A along arrows 2B.

The embodiment in FIGS. 2A-2B is similar to that in the previous embodiment, with the exception of having the outer wall 104 angled inwardly from the base portion 100.

FIG. 3A is a top view of a third embodiment trap barrier. FIG. 3B is a cross-sectional view of the trap barrier of FIG. 3A along arrows 3B. FIG. 3C is a bottom view of the trap barrier of FIG. 3A.

A base portion 300 can form a protector top having a furniture attachment peg extending upward from a mid portion of the base for insertion into a bottom of a furniture leg. Extending below the base can be a downwardly protruding outer side wall 310 forming a channel therein with a furniture support leg 350 extending downwardly from a mid portion of the base. A channel can include a lower facing surface 340 having one of the smooth surface or the pesticide treated surface. The furniture support leg 350 is large enough to raise the outer side wall 310 above the floor support surface.

FIG. 4A is a top view of a fourth embodiment trap barrier. FIG. 4B is a cross-sectional view of the trap barrier of FIG. 4A along arrows 4B. FIG. 4C is a bottom view of the trap barrier of FIG. 4A.

FIGS. 4A-4C are similar to the embodiment of FIGS. 3A-3C with the exception of substituting a caster wheel 360 for the furniture support leg 350.

FIG. 5A is a top view of a fifth embodiment trap barrier. FIG. 5B is a cross-sectional view of the trap barrier of FIG. 5A along arrows 5B. FIG. 5C is a bottom view of the trap barrier of FIG. 5A.

FIGS. 5A-5C are similar to FIGS. 3A-4C with the exception of removing the peg and both the lower facing furniture leg or caster wheel, and instead having a through-hole 220 through the mid-portion of the base for allowing the barrier to be attached to a bottom of a furniture leg by a fastener, such as a screw of bolt.

Figure 6:
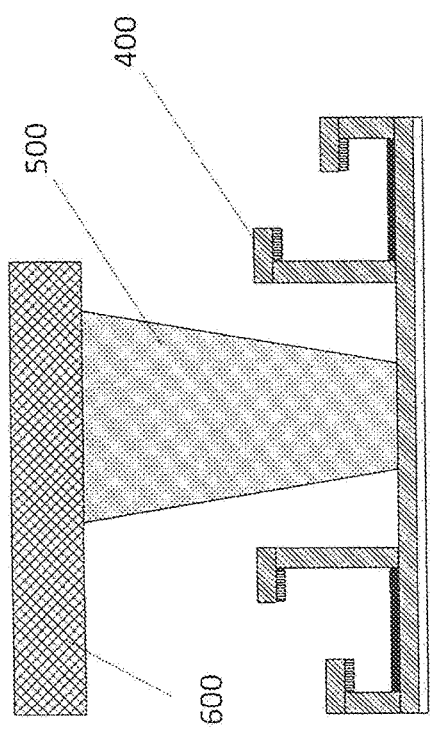
FIG. 6 is a side cross-sectional view of the first embodiment trap barrier used with a small furniture leg.

FIG. 6 is a side cross-sectional view of the first embodiment trap barrier 400 shown and described above in reference with FIGS. 1A-1B used with a small furniture leg 500 which supports a piece of furniture 600 in the wheel well of barrier.

Figure 7:
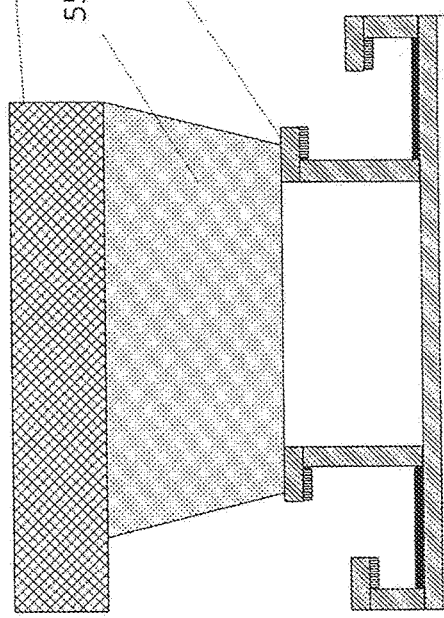
FIG. 7 is a side cross-sectional view of the first embodiment trap barrier used with a large furniture leg.

FIG. 7 is a side cross-sectional view of the first embodiment trap barrier 400 shown and described above in reference to FIGS. 1A-1B, used with a large furniture leg 500 underneath a piece of furniture 600 supported by the outwardly protruding upper edges of the inner wall.

Figure 8:
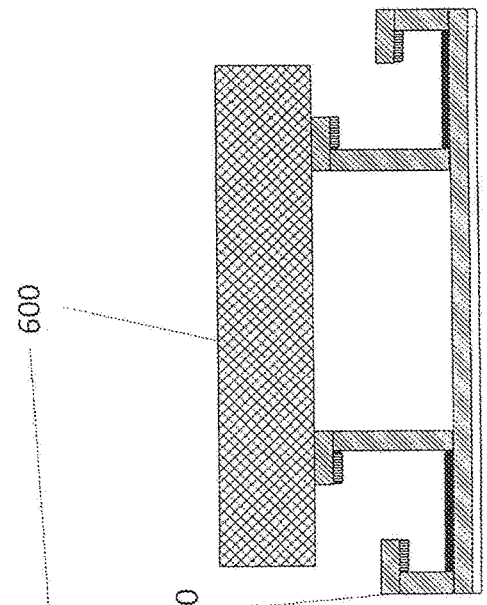
FIG. 8 is a side cross-sectional view of the first embodiment trap barrier supporting the bottom of a furniture leg.

FIG. 8 is a side cross-sectional view of the first embodiment trap barrier 400 shown and described in FIGS. 1A-1B, with the piece of furniture 600 directly supporting the piece of furniture on the outwardly protruding edges of the inner wall.

Figure 9:
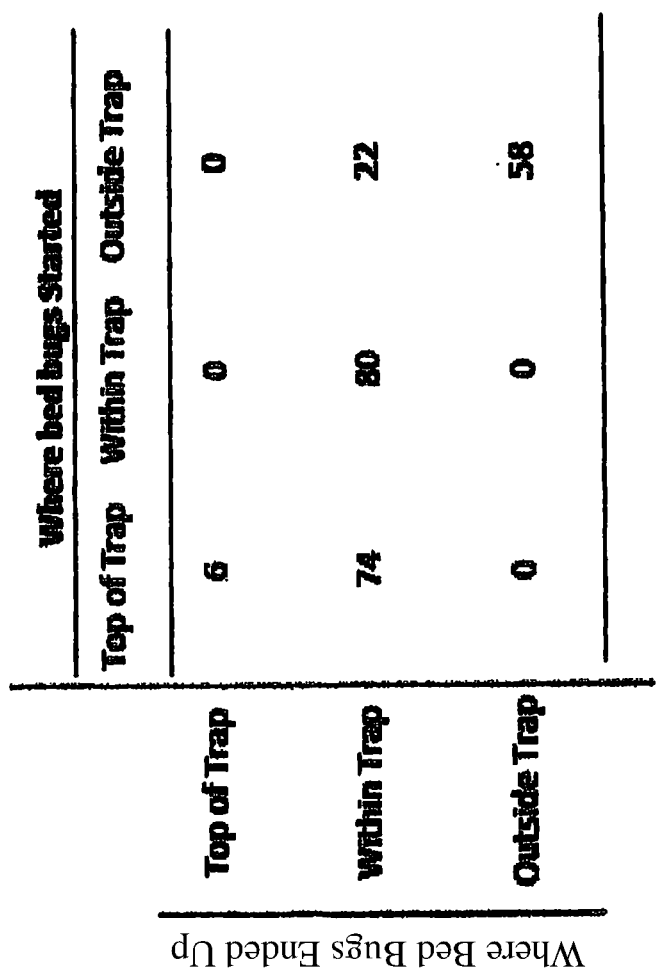
FIG. 9 is a table of bedbugs trapped in the top of the trap, within the trap and outside of the trap.
Figure 10:
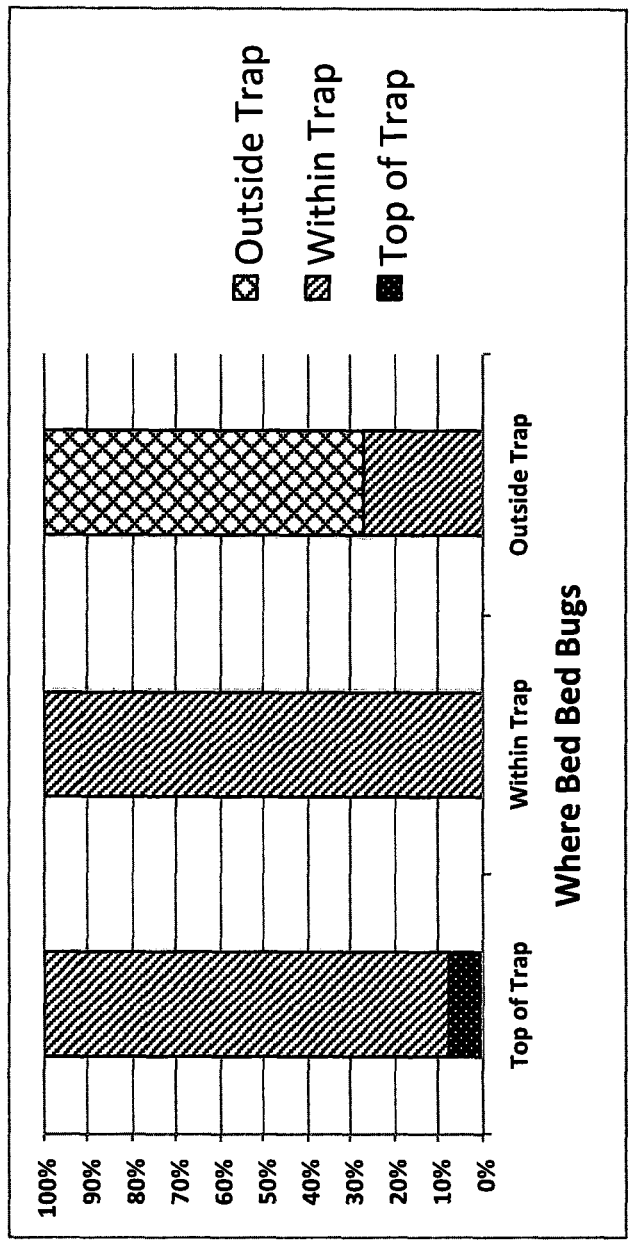
FIG. 10 is a graph of the percentage of bed bugs trapped in the top of the trap, within the trap and outside of the trap.

FIG. 9 is a table of bedbugs trapped in the top of the trap, within the trap and outside of the trap. FIG. 10 is a graph of the percentage of bed bugs trapped in the top of the trap, within the trap and outside of the trap.

Referring to FIGS. 9-10, the test data shows that bedbugs entering the top of the trap can only stay on the top or be trapped within the trap. Once bed bugs are within the trap they cannot escape either going to the top or to the outside of the trap. Bed bugs that are outside of the trap can only stay outside or be trapped within the trap.

The test data provides support for showing bed bugs on the ground cannot climb into the furniture being protected by the trap. Bed bugs already on the furniture can be trapped in the trap if they try to move away from the furniture.

Tests were done using a barrier trap according to the invention. 80 bed bugs were released either on top of the trap (where the furniture leg would be surrounded by the trap), within the trap (the pitfall part of the trap that captures bed bugs), and outside the trap (simulating bed bugs in the room from crawling onto the furniture). The only smooth surfaces of the trap were horizontal to the floor; all other traps have basically a vertical smooth or talc covered smooth surface. Bed bugs were left overnight.

During the test, no bed bugs in the pitfall part of the trap escaped. As such, the pitfall part of the trap has been shown to be 100% effective in preventing bed bugs from moving out of the pitfall area of the trap.

All bed bugs that left the top part of the trap were captured in the pitfall part of the trap. So it was 100% effective in capturing bed bugs that left the top of the trap (furniture contact area). Just a few remained on top of the trap at the end of the assay. A total of 92.5% of bed bugs were captured in this assay.

All bed bugs that moved from the perimeter area and crawled into the trap were captured. So the trap was 100% effective in protecting the legs of furniture from movement of bed bug released near the trap. There was no attractant on top of the trap and most bed bugs settled down in the area around the trap. So 27.5% of bed bugs were captured.

Figure 11:
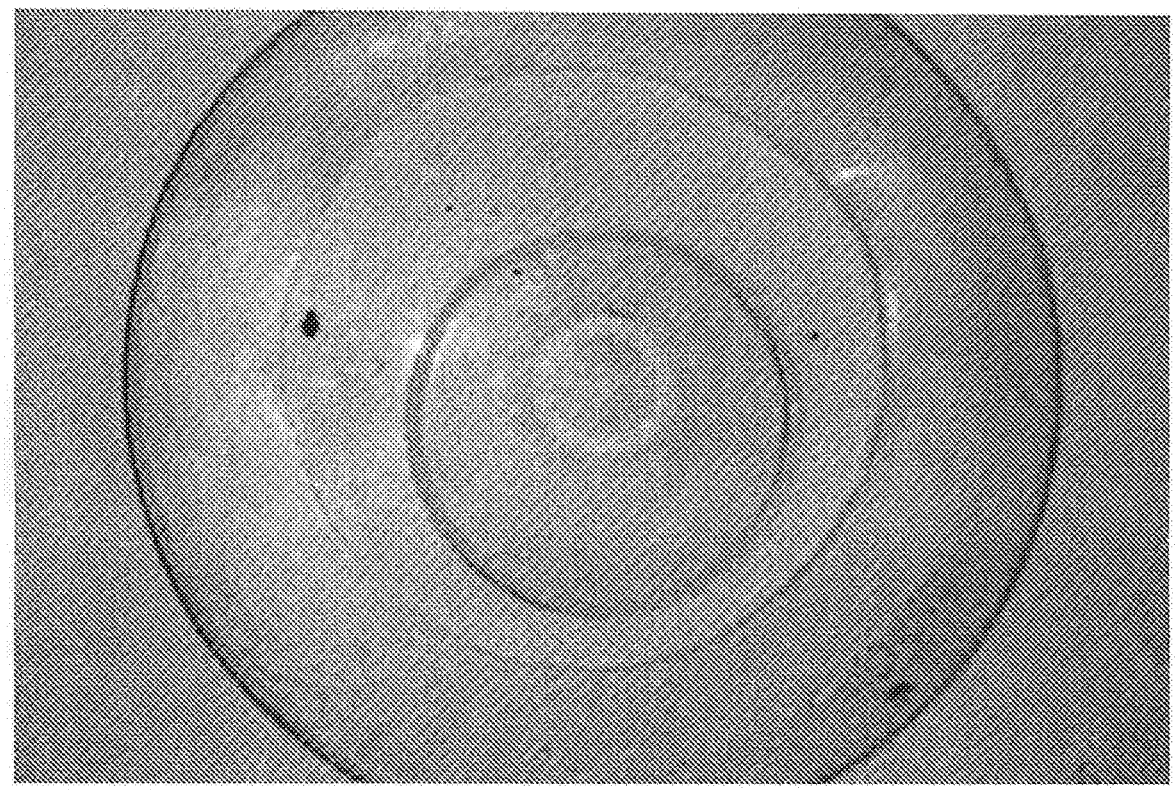
FIG. 11 shows a top view of the UF urban entomology trap used for testing.

FIG. 11 shows a top view of the UF (University of Florida) urban entomology trap used for testing. The trap corresponds to FIGS. 1A and 1B described above.

The UF trap was prepared by adding 2 ml of Mountain Dew then drying the trap with a blow dryer on high heat for approximately 10 minutes. The excess fluid was then poured out and the trap remained unaltered for approximately 24 hours before introducing 8 bed bugs.

Figure 12:
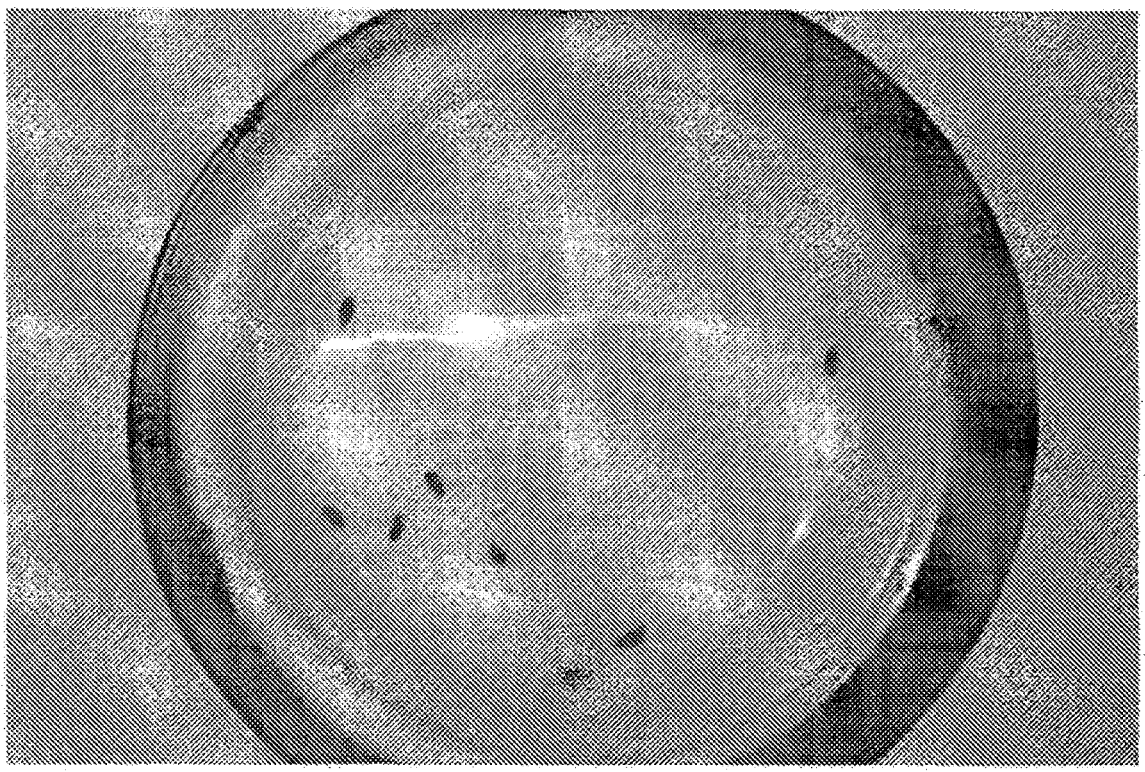
FIG. 12 shows a top view of a commercial climb up trap used for testing.

FIG. 12 shows a top view of a commercial climb up trap used for testing. The Climb up Insect Interceptor is described and shown in U.S. Pat. No. 9,066,511 to McKnight et al. and includes plural pitfall traps to intercept crawling arthropods and insects.

The Climbup traps were prepared using 2 ml of Mountain Dew. The Mountain Dew was dried using the high heat and cool air settings on a blow dryer for approximately 10 minutes. The excess fluid was then poured out and the trap was untouched for approximately 24 hours before introducing 8 bed bugs Testing of 7 Climbup Intereceptors and 7 University of Florida Urban Entomology prototypes was done at the University of Florida, Urban Entomology Lab from spring to summer 2015.

In addition to the traps referenced above, the following materials were used with the traps during the experiments.

Roughly 1 tbsp Guacamole

A small hand full of Lays Original Potato Chips

~2 tbsp Kraft Mac-n-Cheese singles cup, prepared following package instructions

Contents of a vacuum post use on a carpet in a house with animals (dogs and cats) where the owner uses carpet cleaner and pet odor eliminators 2 ml Original Hidden Valley Ranch salad dressing ~120 adult Bed Bugs, KVS strain During testing, food materials such as Guacamole, Potato Chips, Mac-n-Cheese, and salad dressing were dropped into both types of traps (the invention traps and the commercial traps) to simulate what could normally occur during normal use of the traps during human habitation conditions.

The open commercial climb up trap (FIG. 12) can become compromised where the food materials provide a walking surface for the travelling bed bugs to escape the trap and/or climb the furniture.

The dropped food materials on the UF trap (FIG. 11) does not compromise the purpose of the trap, because the slick and/or pesticide treated undersurfaces are not affected by the dropped food materials. As such normal habitation will not detrimentally affect the novel UF traps shown in FIG. 11 and other Figures in the subject application.

Figure 13:
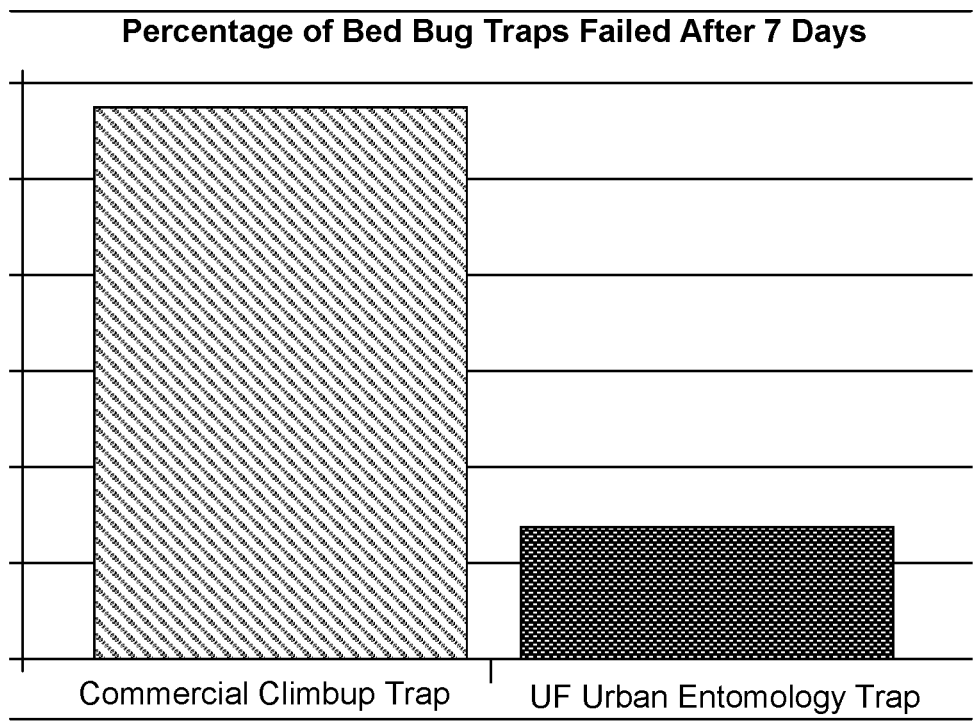
FIG. 13 is a graph showing the percentage of bed bug traps failed after 7 days.

FIG. 13 is a graph showing the percentage of bed bug traps failed after 7 days. After 7 days of use, the UF traps had an approximately 13 to 14% failure rate. The commercial traps had an over 55% failure rate after 7 days which is approximately 4 times (400 percent greater) failure rate than the UF traps.

Figure 14:
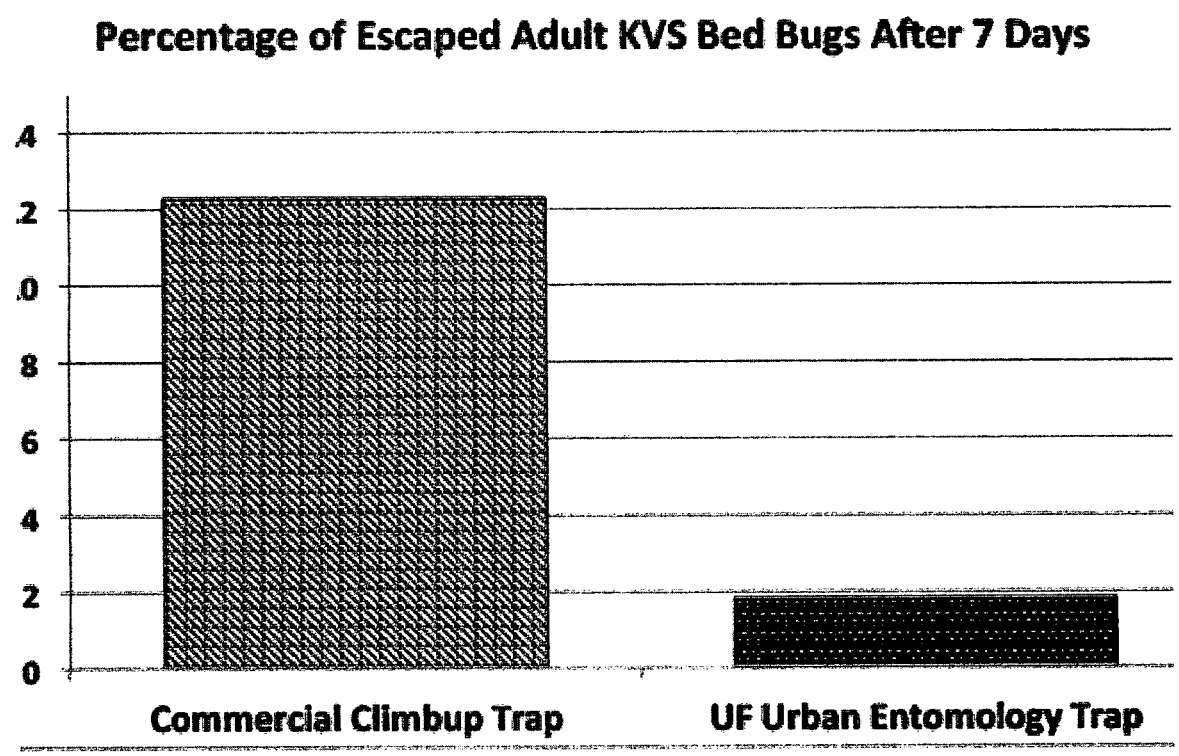
FIG. 14 is a graph showing the percentage of escaped adult KVS bed bugs after 7 days.

FIG. 14 is a graph showing the percentage of escaped adult KVS bed bugs after 7 days. The UF traps had a low percentage of less than approximately 2% of the bed bugs escaping from those traps. The commercial traps had a significantly greater than approximately 12% of the trapped bed bugs escaping from the traps, which is approximately 6 times (600 percent greater) than the UF trap escape percentages.

Figure 15:
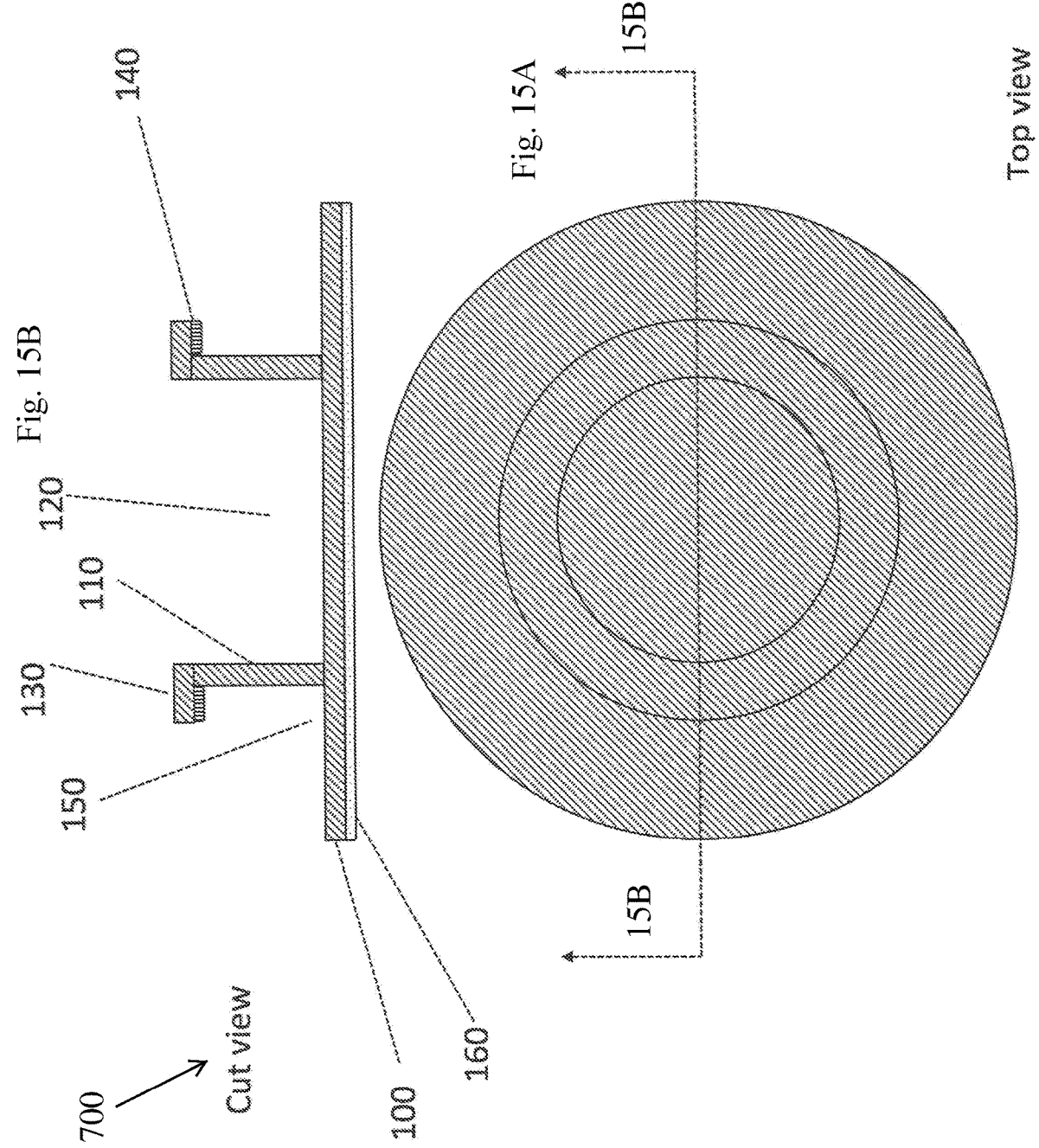
FIG. 15A is a top view of a sixth embodiment trap barrier.
FIG. 15B is a side cross-sectional view of the trap barrier of FIG. 15A along arrows 15B.

FIG. 15A is a top view of a sixth embodiment trap barrier 700. FIG. 15B is a side cross-sectional view of the trap barrier 700 of FIG. 15A along arrows 15B.

The trap barrier 700 is similar to the trap barrier shown and described in reference to FIGS. 1A-1B, the outer well 102 and inner edge 106 are removed so that no trap well (moat) exists. As such crawling arthropods and bed bugs can reach the underside surface 140, which can be a smooth or pesticide treated surface which prevents the crawling arthropods and bed bugs from reaching furniture legs supported by the trap barrier 700.

Turning now to FIGS. 16-23, shown are views of another example trap barrier 800 according to various embodiments of the present disclosure. In various embodiments, the trap barrier 800 of FIGS. 16-23 comprises an assembly of one or more trap barrier rails 803 (e.g., 803a, 803b) that are interconnected to one another and are configured to prevent insects from crawling to or otherwise accessing furniture (e.g., beds, cots, bassinets, cribs, easy chair, reclining chairs, etc.) surrounded by the trap barrier 800.

According to various embodiments, the trap barrier rails 803 may be interconnected to one another to form trap barrier assembly comprising a perimeter shape surrounding furniture (e.g., bed, caster, furniture leg, etc.). In some embodiments, the trap barrier 800 comprises a single trap barrier rail 803 that is formed in a shape (e.g., circle, square, rectangle, hexagon, octagon, triangle, etc.) to surround furniture such that insects are prevented from accessing the furniture when surrounded by the trap barrier 800, as can be appreciated. Indeed, according to various embodiments, furniture surrounded by the trap barrier 800 of the present disclosure is protected from the insects due to the configuration of the trap barrier 800, as will be described below.

Figure 16:
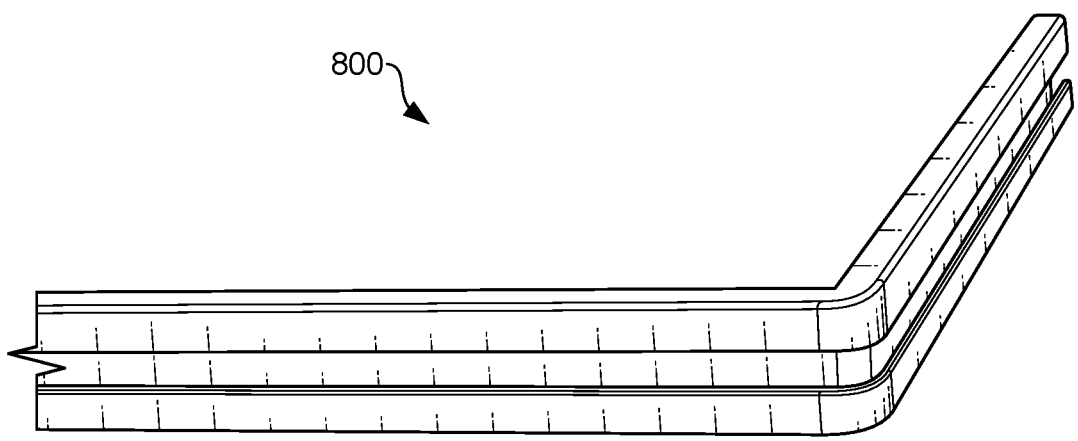
FIG. 16 is an example of a perspective view of another example of a trap barrier.
Figure 17:
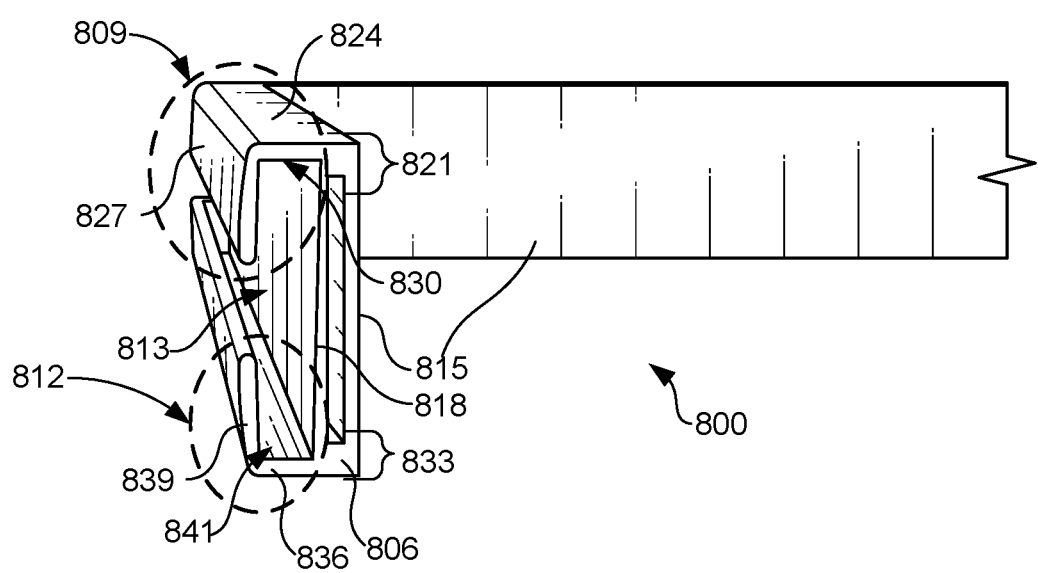
FIG. 17 is an example of a perspective view of a side of the trap barrier of FIG. 16

FIG. 16 illustrates an example of a perspective view of a trap barrier 800 according to various embodiments of the present disclosure. As shown in FIG. 17, which illustrates a perspective side view of the trap barrier 800 according to various embodiments, a trap barrier 800 comprises a barrier wall 806, an upper ledge 809, a lower ledge 812, and a channel 813 being defined by the barrier wall 806, the upper ledge 809, and the lower ledge 812. The barrier wall 806 comprises an outer surface 815 and an inner surface 818. The trap barrier 800 is designed such that the outer surface 815 faces the furniture surrounded by the trap barrier 800.

According to various embodiments, the upper ledge 809 extends way from the inner surface 818 of the barrier wall 806 at a top portion 821 of the barrier wall 806. In some embodiments, the upper ledge 809 extends perpendicularly away from the inner surface 818. In other embodiments, the upper ledge 809 extends away from the inner surface at an angle that is greater than or less than 90 degrees. In various examples, the upper ledge 809 comprises a first upper ledge portion 824 and a second upper ledge portion 827. According to various embodiments, the first upper ledge portion 824 is the portion of the upper ledge 809 that extends from the barrier wall 806 such that the bottom surface 830 of the first upper ledge portion 824 forms a top of the channel 813.

According to various embodiments, the second upper ledge portion 827 extends away from the first upper ledge portion 824 at an angle towards the lower ledge 812 of the barrier trap 800. For example, as shown in the FIG. 17, the second upper ledge portion 827 forms a substantially right angle with the first upper ledge portion 824 and extends downwardly along a vertical plane towards the lower ledge 812 of the barrier trap 800. However, in other embodiments, the second upper ledge portion 827 may extend downwardly at an angle that is less than or greater than 90 degrees. It should be noted that while the upper ledge 809 is illustrated as having planar surfaces, in some embodiments, the upper ledge 809 may be non-planar and may curve away from the inner surface 818 of the barrier wall 806 towards the lower ledge 812.

According to various embodiments, the lower ledge 812 extends way from the inner surface 818 of the barrier wall 806 at a lower portion 833 of the barrier wall 806. In some embodiments, the lower ledge 812 extends perpendicularly away from the inner surface 818. In other embodiments, the lower ledge 812 extends away from the inner surface 818 at an angle that is greater than or less than 90 degrees. In various examples, the lower ledge 812 comprises a first lower ledge portion 836 and a second lower ledge portion 839. According to various embodiments, the first lower ledge portion 836 is the portion of the lower ledge 812 that extends from the barrier wall 806 such that the top surface 841 of the first lower ledge portion 836 forms a bottom of the channel 813.

According to various embodiments, the second lower ledge portion 839 extends away from the first lower ledge portion 836 at an angle towards the upper ledge 809 of the barrier trap 800. For example, as shown in the FIG. 17, the second lower ledge portion 839 forms a substantially right angle with the first lower ledge portion 836 and extends upwardly along a vertical plane towards the upper ledge 809 of the barrier trap 800. However, in other embodiments, the second lower ledge portion 839 may extend upwardly and away from the first lower ledge portion 836 at an angle that is less than or greater than 90 degrees. It should be noted that while the lower ledge 812 is illustrated as having planar surfaces, in some embodiments, the upper ledge 809 may be non-planar and may curve away from the inner surface 818 of the barrier wall 806 towards the upper ledge 809. In addition, the second lower ledge portion 839 is vertically spaced from the second upper ledge portion 827 to allow insects access into the channel 813 via the vertical space between the second lower ledge portion 839 and the second upper ledge portion 827.

According to various embodiments, the inner surfaces of the second upper ledge portion 827 and the second lower ledge portion 839 are substantially parallel to the inner surface 818 of the barrier wall 806. As such, the channel 813 is defined by the inner surface 818 of the barrier wall 806, a bottom surface 830 of the first upper ledge portion 824, a top surface 841 of the first lower ledge portion 836, a first side surface of the second upper ledge portion 827, and a second side inner surface of the second lower ledge portion 839.

According to various embodiments, as insects crawl up the second lower ledge portion 839 of the lower ledge 812, they will enter the channel 813 via the vertical spacing formed between the second lower ledge portion 839 and the second upper ledge portion 827.

According to various embodiments, one or more of the surfaces defining the channel 813 may comprise at least one of a smooth slick surface to prevent the insects from traveling and/or a pesticide-treated surface. As such, insects can become captured within the channel 813. The smooth slick surface may comprise plastic, glass, Teflon coated metal, polished metal, smooth painted surface, smooth varnished surface, plastic laminated paper, polyurethane, polyacrylic, Plexiglas and/or other type of smooth slick surface as can be appreciated.

Pesticide treated surfaces can include but are not limited to Pyrethroids (e.g. permethrin, cypermethrin, lambacyhalothrin, cyfluthrin), organophosphates (e.g. malathion, dichlorvos), carbamates (e.g. propoxur, methomyl), repellents (e.g. diethyl toluamide, piperazines), essential plant oils (e.g. lemongrass oil, thyme oil, citronella, geraniol).

In some examples, a channel defining surface comprises both a smooth slick surface and a pesticide treated surface. In other examples, a channel defining surface comprises a sticky surface.

In some examples, a trap barrier 800 comprises a solid one-piece assembly. In other examples, a trap barrier 800 comprises multiple trap barrier rails 803 (e.g., 803a, 803b, 803c) that are configured to interconnect to one another to form a perimeter shape for surrounding a piece or portion of a piece of furniture. For example, according to various embodiments, the trap barrier 800 comprises an assembly of one or more a trap barrier rails 803. For example, multiple trap barrier rails 803 can be connected to one another to form a shape that provides a perimeter boundary surrounding furniture, as can be appreciated. In various examples, the trap barrier rails 803 each comprise a barrier wall 806, an upper ledge 809, a lower ledge 812, and a channel 813. As can be appreciated, as the barrier rails 803 are interconnected to one another, the barrier wall 806, the upper ledge 809, the lower ledge 812, and the channel 813 of the trap barrier 800 are all extended due to the connection of the individual trap barrier rails 803.

Figure 18A:
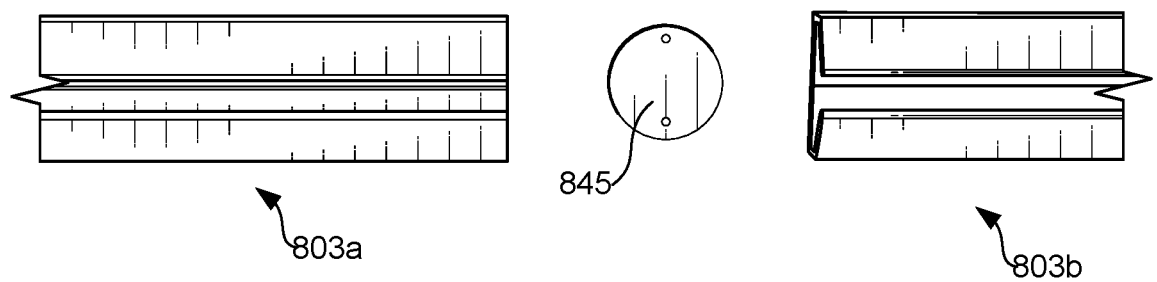
FIGS. 18A and 18B illustrate examples of trap barrier rails of the trap barrier of FIG. 16 being interconnected according to various embodiments.
Figure 18B:
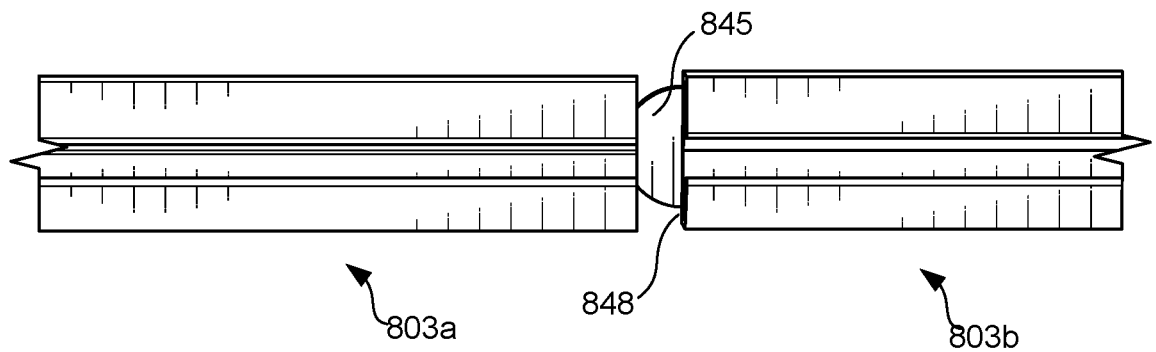
Figure 19:
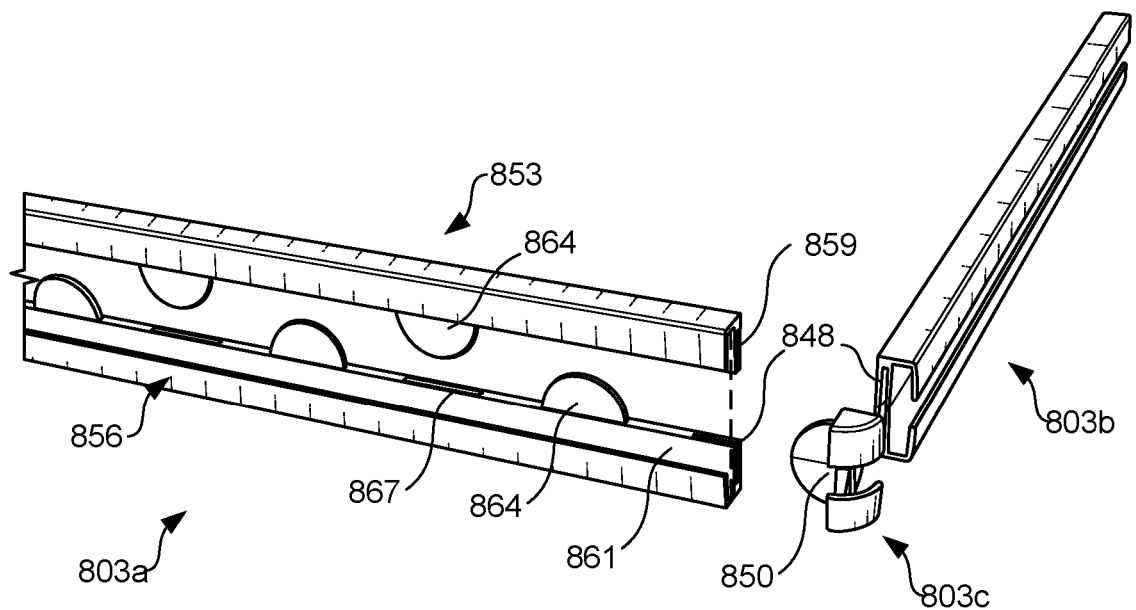
FIG. 19 illustrates an example of an expanded view of the trap barrier of FIG. 16.
Figure 20:
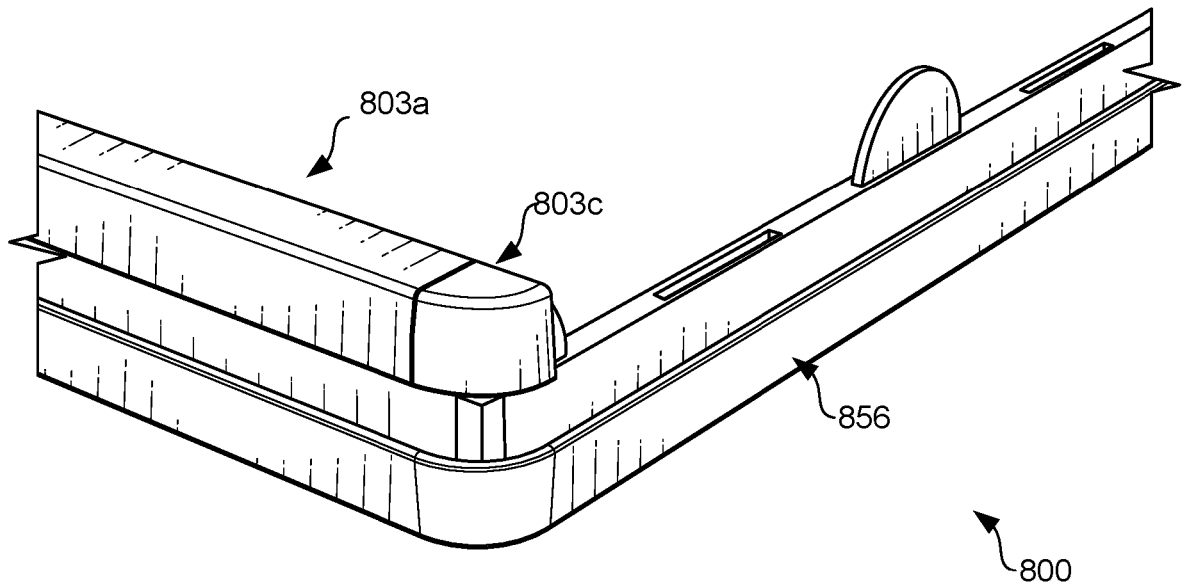
FIG. 20 illustrates an example of a perspective view of a portion of the trap barrier of FIG. 16.

According to various embodiments, the trap barrier rails 803 may comprise linear barrier rails 803a, 803b, angled barrier rails 803c (FIG. 19), and/or other type of shaped trap barrier rail as can be appreciated. FIGS. 18A and 18B illustrate one or more linear trap barrier rails 803a, 803b coupled to one another via a placement of an extension member 845 into vertical recesses 848 located at ends of the trap barrier rails 803. In particular, FIG. 18A illustrates two linear trap barrier rails 803a, 803b and an extension member 845, and FIG. 18B illustrates how the two linear trap barrier rails 803a, 803b are connected to one another by placing the extension member 845 into the vertical recesses 848 combined to elongate a length of a trap barrier 800. Although the extension member 845 is illustrated as a circle in FIGS. 18A and 18B, it should be appreciated that the extension member 845 can comprise an shape (e.g., square, rectangle, oval, octagon, pentagon, etc.) that allows engagement with the vertical recess 848 of the other trap barrier rails 803, as can be appreciated According to various embodiments, an angled barrier rail 803c can be connected to two linear trap barrier rails 803a, 803b to form an angle for the trap barrier 800. In various examples, an angled barrier rail 803c comprises vertical mating extensions 850 that extend from each end of the barrier wall 806 of the angled barrier rail 803c. As shown in FIGS. 19 and 20, when connecting the angled barrier rail 803c to a linear trap barrier rail 803a, 803b, the vertical mating extensions 850 are configured to engage with and be disposed within vertical recesses 848 formed within the barrier wall 806 of the linear trap barrier rails 803a, 803b. In particular, FIGS. 19 and 20 illustrate an example of how the angled barrier rail and the linear trap barrier rails 803a, 803b can be interconnected to extend a length of the trap barrier 800 and form a desired shape for the trap barrier 800 according to various embodiments of the present disclosure.

In some embodiments, a linear trap barrier rail 803 comprises a solid one-piece structure. However in other embodiments, a trap barrier rail 803 may comprise a first trap barrier rail member 853 and a second trap barrier rail member 856 that are interconnected to one another to from a trap barrier rail 803. For example, FIG. 19 illustrates an expanded view of a linear trap barrier rail 803a comprising a first trap barrier rail member 853 and a second trap barrier rail member 856. According to various examples, the first trap barrier rail member 853 comprises the upper ledge 809 and a first barrier wall portion 859 and the second trap barrier rail member 856 comprises the lower ledge 812 and a second barrier wall portion 861. The first trap barrier rail member 853 is configured to engage with and connect with the second trap barrier rail member 856 such that the first barrier wall portion 859 and the second barrier wall portion 861 form the barrier wall 806 of the trap barrier rail 803.

According to various embodiments, the first trap barrier rail member 853 and the second trap barrier rail member 856 each comprises at least one horizontal mating extension 864 and at least one horizontal mating recess 867 that is deposed within the respective barrier wall portion 856, 859. The at least one horizontal mating extension 864 of the first trap barrier rail member 853 is configured to align with and be disposed within the at least one horizontal mating recess 867 of the second trap barrier rail member 856. Likewise, the at least one horizontal mating extension 864 of the second trap barrier rail member 856 is configured to align with and be disposed with the at least one horizontal mating recess 867 of the first trap barrier rail member 853. In various examples, the first trap barrier rail member 853 comprises a mirrored configuration of the second trap barrier rail member 856.

FIG. 20 illustrate an example perspective view showing how a first linear barrier rail 803*a* is connected to an angled trap barrier rail 803*c* which is then connected to a second trap barrier rail member 856 of a second linear barrier rail 803*b* according to various embodiments of the present disclosure.

Figure 21:
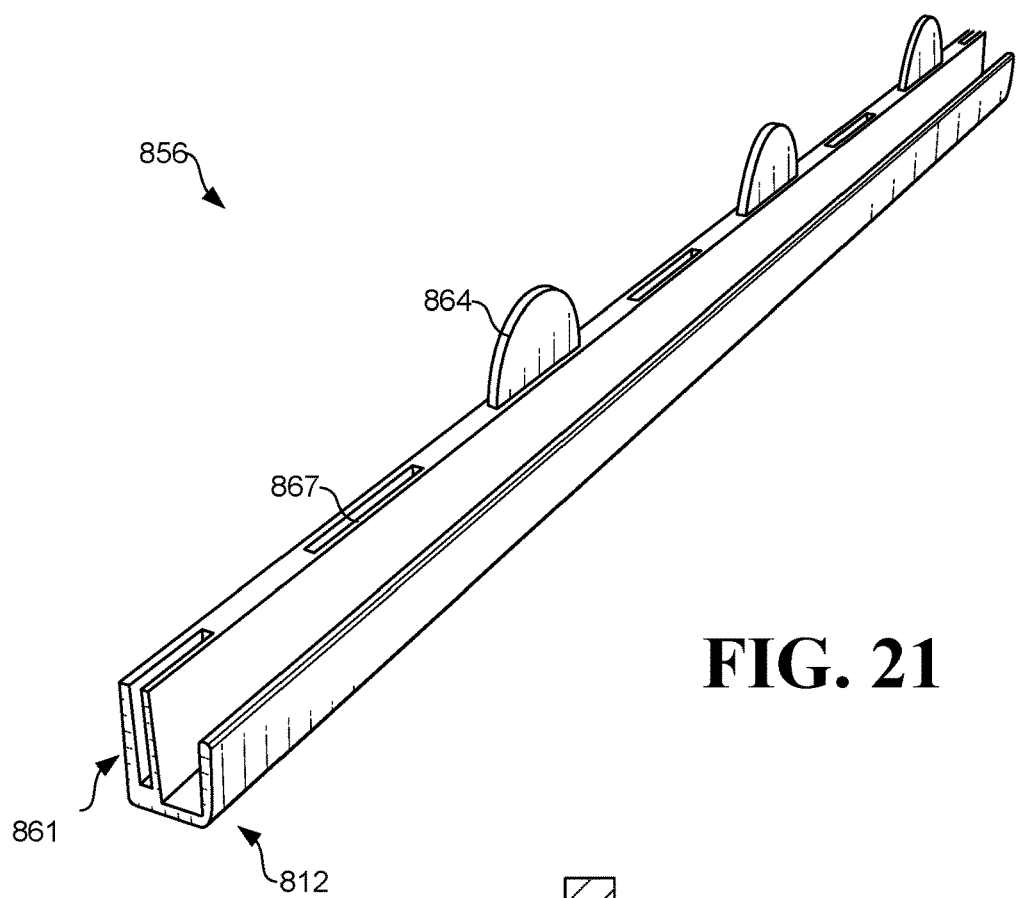
FIG. 21 illustrates a perspective view of a trap barrier rail member of the trap barrier of FIG. 16.
Figure 22:
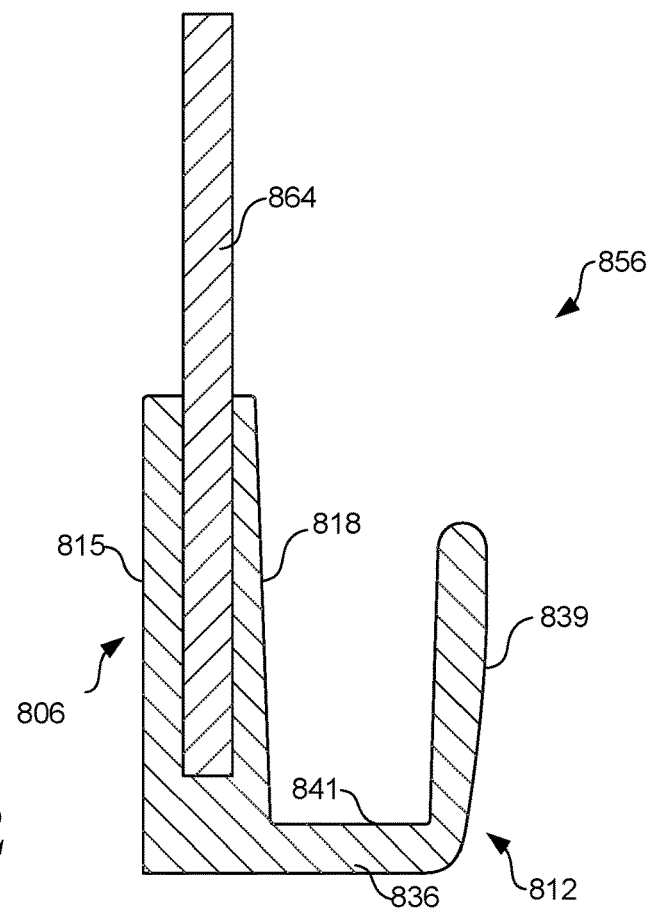
FIG. 22 illustrates a cross sectional view of the trap barrier rail member of FIG. 21.

FIG. 21 illustrates a perspective view of a second trap barrier rail member 856 and FIG. 22 illustrates a cross sectional view of the second trap barrier rail member 856 according to various embodiments of the present disclosure. As previously discussed, the second trap barrier rail member 856 comprises the lower ledge 812 extending from a second barrier wall portion 861. The second trap barrier rail member 856 of FIG. 21 further includes horizontal matting recesses 867 that are alternatively spaced from the horizontal mating recesses 867.

Figure 23:
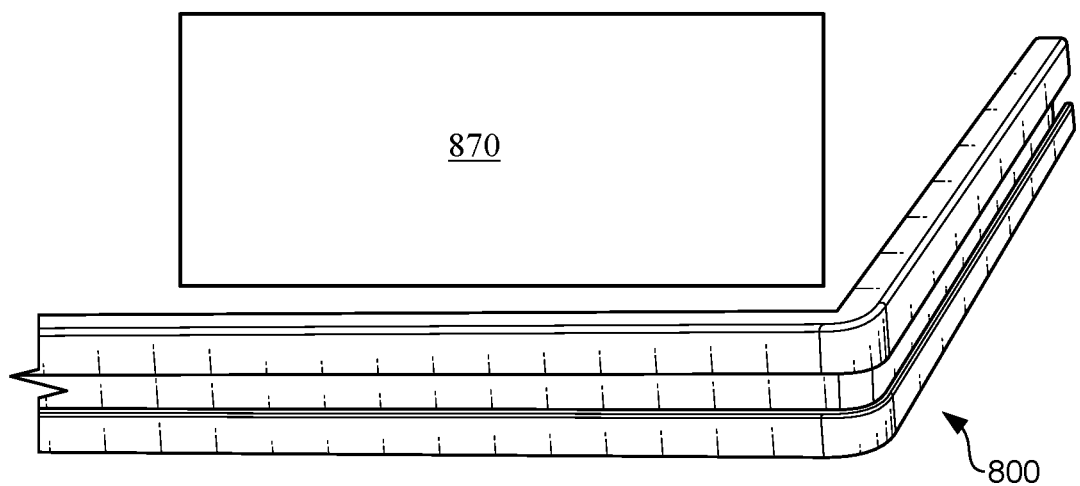
FIG. 23 illustrates an example of the trap barrier of FIG. 16 being placed next to furniture to protect the furniture from insects.

FIG. 23 illustrates an example view of a trap barrier 800 being placed around furniture 870 in accordance to various embodiments of the present disclosure. As discussed, the furniture can comprise different types of furniture, such as but not limited to beds, cots, bassinets, cribs, easy chair, reclining chairs, and any other furniture, where a person would rest or sleep.

With the embodiments described, above, the upside down smooth or pesticide treated surfaces would not generally attract dirt, since these treated surfaces are elevated underneath pitfall barriers.

Although the embodiments describe having either a smooth or pesticide treated under surface areas, the invention can be practiced with an underside surface area portions having a combined smooth (slick) and pesticide surface for the upside down facing surfaces that do not touch a floor surface.

The invention can be used in other applications in addition to being underneath furniture. For example, the novel traps can be placed in various locations around a space, such as on a floor, stairs, a shelf, top of furniture, in commercial locations (hotels, motels and the like) as well as any residential locations (houses, condominiums, and the like). The novel invention can be used in other areas were bed bugs can occur, such as but not limited to recreational vehicles, truck cabins, inside vans and automobiles, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skills in the art to which this invention belongs. It will be further understood that the terms, such as those defined in commonly used dictionaries, should be interpreted as having a meaning that is consistent with their meaning in the context of the relevant art and the present disclosure and will not be interpreted in an idealized or overly formal sense unless they are expressly so defined herein.

The term "substantially" is meant to permit deviations from the descriptive term that do not negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate it, a concentration range of "about 0.1% to about 5%" should be interpreted to include not only the explicitly recited concentration of about 0.1 wt % to about 5 wt %, but also include individual concentrations (e.g., 1%, 2%, 3% and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

We claim:

1. A trap barrier for insects, comprising:

a barrier wall having an inner surface and an outer surface and comprising a first vertical side recess at a first side end of the barrier wall and a second vertical side recess at a second side end of the barrier wall, the first side recess and the second side recess being disposed between the inner surface and the outer surface, the barrier wall being formed by interconnecting an upper barrier wall portion with a lower barrier wall portion;

an upper ledge comprising a first upper ledge portion and a second upper ledge portion, the first upper ledge portion extending perpendicularly from the inner surface at a top end of the upper barrier wall portion, and the second upper ledge portion extending away from the first upper ledge portion at an angle;

a lower ledge comprising a first lower ledge portion and a second lower ledge portion, the first lower ledge portion extending perpendicularly from the inner surface at a bottom end of the lower barrier wall portion, and the second lower ledge portion extending away from the first lower ledge portion and towards the upper ledge; and wherein furniture placed adjacent to the outer surface of the barrier wall is protected from insects.

2. The trap barrier of claim 1, wherein the upper ledge and the lower ledge form a channel being defined by the inner surface of the barrier wall, a bottom surface of the first upper ledge portion, a top surface of the first lower ledge portion, a first side inner surface of the second upper ledge portion, and a second side inner surface of the second lower ledge portion.

3. The trap barrier of claim 2, wherein at least one of the bottom surface of the first upper ledge portion, the inner surface of the barrier wall, the first side inner surface or the second side inner surface comprises a smooth slick surface for both preventing insects from traveling and capturing insects within the channel.

4. The trap barrier of claim 3, wherein the smooth slick surface comprises at least one of plastic, glass, Teflon coated metal, polished metal, smooth painted surface or smooth varnished surface.

5. The trap barrier of claim 1, wherein a top surface of the first lower ledge portion comprises a pesticide treated surface.

6. The trap barrier of claim 5, wherein the pesticide treated surface is selected from one of pyrethroids, organophosphates, repellants, or plant oils.

7. The trap barrier of claim 1, wherein the upper barrier wall portion comprises a mirrored configuration of the lower barrier wall portion.

8. The trap barrier of claim 1, wherein the upper barrier wall portion and the lower barrier wall portion each have a respective plurality of mating extensions and a respective plurality of mating recesses, the upper barrier wall portion being interconnected with the lower barrier wall portion by aligning and engaging the mating extensions of the upper barrier wall portion with the mating recesses of the lower barrier wall portion.

9. A plurality of trap barriers, individual trap barriers of the plurality of trap barriers according to the trap barrier of claim 1, the plurality of trap barriers comprising at least a first trap barrier and at least a second trap barrier, and wherein the first vertical side recess of the first side end of the first trap barrier connects to the second vertical side recess of the second side end of the second trap barrier via a mating extension.

10. A trap barrier assembly for insects comprising:
a plurality of trap barrier rails interconnected to one another, each trap barrier rail of the plurality of trap barrier rails comprising:
a barrier wall having an inner surface and an outer surface, the barrier wall horizontally extending from a first side end to a second side end;
an upper ledge comprising a first upper ledge portion and a second upper ledge portion, the first upper ledge portion extending perpendicularly from the inner surface at a top portion of the barrier wall, and the second upper ledge portion extending downwardly at an angle from a bottom surface of the first upper ledge portion; and
a lower ledge comprising a first lower ledge portion and a second lower ledge portion, the first lower ledge portion extending perpendicularly from the inner surface at a bottom portion of the barrier wall, and the second lower ledge portion extending upwardly at an angle from a top surface of the first lower ledge portion;
a first end vertical recess disposed between the inner surface and the outer surface of the barrier wall at the first side end of the barrier wall; and
a second side end vertical recess disposed between the inner surface and the outer surface of the barrier wall at the second side end of the barrier wall,
wherein the first side end vertical recess of one of the plurality of trap barrier rails is connected to the second side end vertical recess of another of the plurality of trap barrier rails via a mating extension; and
wherein furniture surrounded by the trap barrier assembly is protected from insects.

11. The trap barrier assembly of claim 10, wherein the plurality of trap barrier rails comprises a first linear barrier rail, a second linear barrier rail, and an angled barrier rail.

12. The trap barrier assembly of claim 11, wherein the mating extension comprises a first mating extension, and the angled barrier rail comprises a second mating extension extending from a first side of the barrier wall and a third mating extension extending from a second side of the barrier wall.

13. The trap barrier assembly of claim 12, wherein the first mating extension of the angled barrier rail is engaged with and coupled to the first linear barrier rail via a respective first end vertical recess and the second mating extension of the angled barrier rail is engaged with and coupled to the second linear barrier rail via a respective second end vertical recess.

14. The trap barrier assembly of claim 11, wherein the first linear barrier rail and the second linear barrier rail each comprise a respective upper barrier rail member interconnected with a respective lower barrier rail member.

15. The trap barrier assembly of claim 14, wherein the respective upper barrier rail member and the respective lower barrier rail member each comprise a respective plurality of mating extensions and a respective plurality of mating recesses along a respective longitudinal length of the respective upper barrier rail member and the respective lower barrier rail member, the respective upper barrier rail member being interconnected with the respective lower barrier rail member by aligning and engaging the mating extensions of the respective upper barrier rail member with the mating recesses of the respective lower barrier rail member, the barrier wall being formed through an interconnection of an upper barrier wall portion of the respective upper barrier rail member and a lower barrier wall portion of the respective lower barrier rail member.

16. The trap barrier assembly of claim 11, wherein each of the trap barrier rails further comprises a channel defined by the inner surface of the barrier wall, a bottom surface of the first upper ledge portion, a top surface of the first lower ledge portion, a first side inner surface of the second upper ledge portion, and a second side inner surface of the second lower ledge portion.

17. The trap barrier assembly of claim 16, wherein at least one of the bottom surface of the first upper ledge portion, the inner surface of the barrier wall, the first side inner surface or the second side inner surface comprises a smooth slick surface for both preventing insects from traveling and capturing insects within the channel.

18. A trap barrier rail for insects, comprising:
an upper rail member; and
a lower rail member being configured to interconnect with the upper rail member, wherein the upper rail member comprises:
- an upper barrier wall section having a first inner surface and a first outer surface;
- a first ledge extending perpendicular from the first inner surface of the upper barrier wall section; and
- a first plurality of mating recesses being disposed within a bottom surface of the upper barrier wall section, and a first plurality of mating extensions extending from the bottom surface of the upper barrier wall section;

wherein the lower rail member comprises:
- a lower barrier wall section having a second inner surface and a second outer surface;
- a second ledge extending perpendicular from the second inner surface of the lower barrier wall section; and
- a second plurality of mating recesses being disposed within a top surface of the lower barrier wall section, and a second plurality of mating extensions extending from the top surface of the lower barrier wall section; and wherein the lower rail member is configured to interconnect with the upper rail member to form a barrier wall comprising the upper barrier wall section and the lower barrier wall section by:
- placing the upper rail member on top of the lower rail member,
- mating the first plurality of mating extensions with the second plurality of mating recesses, and
- mating the first plurality of mating recesses with the second plurality of mating extensions;

wherein furniture placed adjacent to an outer surface of the barrier wall is protected from insects.

19. A trap barrier rail assembly, comprising a plurality of interconnected trap barrier rails, each trap barrier rail according to claim 18.

20. The trap barrier rail of claim 18, wherein the upper rail member comprises a mirrored configuration of the lower rail member.

\* \* \* \* \*